United States Patent
Tamura

(10) Patent No.: US 10,298,478 B2
(45) Date of Patent: May 21, 2019

(54) INFORMATION PROCESSING SYSTEM, COMPUTER-READABLE RECORDING MEDIUM HAVING STORED THEREIN CONTROL PROGRAM FOR INFORMATION PROCESSING DEVICE, AND CONTROL METHOD OF INFORMATION PROCESSING SYSTEM

(71) Applicant: FUJITSU LIMITED, Kawasaki-shi, Kanagawa (JP)

(72) Inventor: Masahisa Tamura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 926 days.

(21) Appl. No.: 14/197,266

(22) Filed: Mar. 5, 2014

(65) Prior Publication Data
US 2014/0297845 A1    Oct. 2, 2014

(30) Foreign Application Priority Data
Mar. 29, 2013    (JP) ................. 2013-071904

(51) Int. Cl.
*G06F 15/173*    (2006.01)
*H04L 12/26*    (2006.01)
(Continued)

(52) U.S. Cl.
CPC .......... *H04L 43/10* (2013.01); *G06F 11/1425* (2013.01); *G06F 11/2094* (2013.01); *H04L 43/0817* (2013.01)

(58) Field of Classification Search
CPC .............................. G06F 11/30; H04L 43/0817
(Continued)

(56) References Cited

U.S. PATENT DOCUMENTS

2009/0327642 A1    12/2009  Ogihara et al.
2010/0268908 A1*   10/2010  Ouyang .............. G06F 11/2094
                                                        711/170
(Continued)

FOREIGN PATENT DOCUMENTS

JP    2002-132535 A    5/2002
JP    2010-258614      11/2010
(Continued)

OTHER PUBLICATIONS

Japanese Office Action dated Oct. 4, 2016 for corresponding Japanese Patent Application No. 2013-071904, with Partial English Translation, 5 pages.

*Primary Examiner* — Normin Abedin
(74) *Attorney, Agent, or Firm* — Fujitsu Patent Center

(57) ABSTRACT

An information processing system includes a plurality of information processing apparatuses connected to each other, and communication is performed between the plurality of information processing apparatuses. Each of the plurality of information processing apparatuses includes a processor. The processor included in one of the plurality of information processing devices serving as a first information processing device receives, from each of second information processing devices other than the first information processing device, state information regarding each state of the plurality of information processing devices determined by the second information processing devices, determines each state of the plurality of information processing devices, based on the state information received from each of the second information processing devices, and transmits state information for transmission regarding the determined state of each of the plurality of information processing devices to each of the second information processing devices.

10 Claims, 26 Drawing Sheets

(51) Int. Cl.
*G06F 11/14* (2006.01)
*G06F 11/20* (2006.01)

(58) Field of Classification Search
USPC .......................................................... 709/224
See application file for complete search history.

(56) References Cited

U.S. PATENT DOCUMENTS

2014/0025808 A1* 1/2014 Ito ........................... H04L 43/10
                                                    709/224
2015/0248460 A1* 9/2015 Machida ............. G06F 11/3055
                                                    707/639

FOREIGN PATENT DOCUMENTS

| JP | 2011-505617 | 2/2011 |
| JP | 2011-055231 | 3/2011 |
| WO | 2008/114441 | 9/2008 |

* cited by examiner

FIG. 4

NODE STATE INFORMATION (STATE INFORMATION) ~T1

| NODE ID | STATE | IP ADDRESS | PORT NUMBER |
|---------|---------|-------------|-------------|
| 1 | Alive | 192.168.0.1 | 12345 |
| 2 | Alive | 192.168.0.2 | 12345 |
| 3 | Alive | 192.168.0.3 | 12345 |
| 4 | Suspect | 192.168.0.4 | 12345 |
| 5 | Alive | 192.168.0.5 | 12345 |

FIG. 5

NODE STATE MANAGEMENT INFORMATION ~T2

| NODE ID | STATE | by 2 | by 3 | by 4 | by 5 | LAST UPDATE INFORMATION | IP ADDRESS | PORT NUMBER |
|---------|---------|-------|---------|-------|---------|-------------------------|-------------|-------------|
| 1 | Alive | Alive | Alive | Alive | Alive | 1 sec ago | 192.168.0.1 | 12345 |
| 2 | Alive | Alive | Alive | Alive | Alive | 1 sec ago | 192.168.0.2 | 12345 |
| 3 | Alive | Alive | Alive | Alive | Alive | 1 sec ago | 192.168.0.3 | 12345 |
| 4 | Suspect | Alive | Suspect | Alive | Suspect | 30 sec ago | 192.168.0.4 | 12345 |
| 5 | Alive | Alive | Alive | Alive | Alive | 1 sec ago | 192.168.0.5 | 12345 |

DETERMINATION AT THE NODE

INFORMATION FROM OTHER NODES

FIG. 6

TRANSMISSION INFORMATION  ⤺T3

| NODE ID | STATE | IP ADDRESS | PORT NUMBER |
|---|---|---|---|
| 6 | Alive | 192.168.0.6 | 12345 |

FIG. 7

NODE STATE INFORMATION (STATE INFORMATION) ~T1'

| NODE ID | STATE | IP ADDRESS | PORT NUMBER |
|---|---|---|---|
| 1 | Alive | 192.168.0.1 | 12345 |
| 2 | Alive | 192.168.0.2 | 12345 |
| 3 | Alive | 192.168.0.3 | 12345 |
| 4 | Suspect | 192.168.0.4 | 12345 |
| 5 | Alive | 192.168.0.5 | 12345 |
| 6 | Alive | 192.168.0.6 | 12345 |

FIG. 15

PARTY MANAGEMENT INFORMATION  ~T4

| PARTY ID | NODE ID | VERSION NUMBER |
|---|---|---|
| A | 1~10 | 1 |
| B | 11~20 | 1 |
| C | 21~30 | 3 |
| D | 31~40 | 4 |
| E | 41~50 | 2 |

FIG. 17

REPRESENTATIVE NODE STATE INFORMATION
(REPRESENTATIVE STATE INFORMATION)
(FROM REPRESENTATIVE NODE TO MEMBER NODE,
FROM REPRESENTATIVE NODE TO REPRESENTATIVE NODE)

↙ T5

| NODE ID | STATE | IP ADDRESS | PORT NUMBER |
|---|---|---|---|
| 1 | Alive | 192.168.0.1 | 12345 |
| 2 | Alive | 192.168.0.2 | 12345 |
| 3 | Alive | 192.168.0.3 | 12345 |
| 11 | Alive | 192.168.0.11 | 12345 |
| 12 | Alive | 192.168.0.12 | 12345 |
| 13 | Alive | 192.168.0.13 | 12345 |
| 21 | Alive | 192.168.0.21 | 12345 |
| 22 | Alive | 192.168.0.22 | 12345 |
| 23 | Alive | 192.168.0.23 | 12345 |

FIG. 19

NODE STATE MANAGEMENT INFORMATION  ~T7

| NODE ID | STATE | by 2 | by 3 | by 11 | by 12 | by 13 | by 21 | by 22 | by 23 | LAST UPDATE INFORMATION | IP ADDRESS | PORT NUMBER |
|---|---|---|---|---|---|---|---|---|---|---|---|---|
| 1 | Alive | Alive | Alive | Alive | | | Alive | | | 1sec ago | 192.168.0.1 | 12345 |
| 2 | Alive | Alive | Alive | | | | | | | 1sec ago | 192.168.0.2 | 12345 |
| 3 | Alive | Alive | Alive | | | | | | | 1sec ago | 192.168.0.3 | 12345 |
| 11 | Alive | | | Alive | Alive | Alive | Alive | | | 1sec ago | 192.168.0.11 | 12345 |
| 12 | Alive | | | Alive | Alive | Alive | | | | | 192.168.0.12 | 12345 |
| 13 | Alive | | | Alive | Alive | | | | | | 192.168.0.13 | 12345 |
| 21 | Alive | | | Alive | | | Alive | Alive | Alive | 1sec ago | 192.168.0.21 | 12345 |
| 22 | Alive | | | | | | Alive | Alive | Alive | | 192.168.0.22 | 12345 |
| 23 | Alive | | | | | | Alive | Alive | Alive | | 192.168.0.23 | 12345 |

☐ DETERMINATION AT THE NODE

⌐ ¬
└ ┘ DETERMINATION AT REPRESENTATIVE NODE AT THE TIME OF HEARTBEAT NON-ARRIVAL BETWEEN REPRESENTATIVE NODES

☐ DETERMINATION AT OTHER NODES IS USED

◯ REFERRED TO IN DETERMINATION AT THE NODE

◯ (dashed) REFERRED TO IN DETERMINATION AT REPRESENTATIVE NODE AT THE TIME OF HEARTBEAT NON-ARRIVAL BETWEEN REPRESENTATIVE NODES

INFORMATION PROCESSING SYSTEM, COMPUTER-READABLE RECORDING MEDIUM HAVING STORED THEREIN CONTROL PROGRAM FOR INFORMATION PROCESSING DEVICE, AND CONTROL METHOD OF INFORMATION PROCESSING SYSTEM

CROSS-REFERENCE TO RELATED APPLICATION

This application is based upon and claims the benefit of priority of the prior Japanese Patent Application No. 2013-071904, filed on Mar. 29, 2013, the entire contents of which are incorporated herein by reference.

FIELD

The present invention relates to an information processing system, a computer-readable recording medium having stored therein a control program for an information processing device, and a control method of an information processing system.

BACKGROUND

A distributed storage system (a storage system, an information processing system) is known which includes a plurality of nodes (storage devices, information processing devices) and stores data so as to be distributed in a plurality of nodes.

In the distributed storage system, for example, when a failure occurs in one node of the plurality of nodes, a client that uses the distributed storage system is difficult to access the failed node.

In addition, when the failed node is made redundant with other nodes, the client can access the redundant node instead of the failed node. However, the distributed storage system including the redundant nodes is in an unreliable state with low redundancy until the replacement of the failed node and recovery processing, which is for recovering the multiplexing state of data before the failure occurs in the node, are performed.

Therefore, in the distributed storage system, it is preferable to detect a node failure quickly by monitoring the states of a plurality of nodes.

In the distributed storage system, however, there is a case where a plurality of nodes are split from each other due to node failure or the failure of the link between nodes and one node and another node that are split from each other may make different determinations regarding the node failure. This state is called a split brain state. As an example of the split brain state, a case can be mentioned in which one node and another node are difficult to access each other due to the failure of the link therebetween but both the nodes determine that each partner node has failed.

For example, when one node and another node store redundant data of the same data, if the nodes fall into the split brain state, both the nodes may update the stored redundant data separately or may perform recovery processing on each partner node. This may destroy the consistency of redundant data.

As methods to prevent falling into the split brain state in the distributed storage system, methods exemplified below are known.

(1) Each of a plurality of nodes notifies a predetermined node (control node) of the plurality of nodes of the configuration information and survival report of the node. The control node monitors the plurality of nodes based on the information obtained from each of the plurality of nodes. When a failed node is detected from the monitoring result, the control node performs recovery processing and notifies the administrator or the like of the failure of the node.

(2) Each of a plurality of nodes exchanges its survival report with other nodes (information exchange phase), and selects which node is to perform monitoring and failed node detection by making an agreement with the other nodes. The agreed node (determined node) monitors each state of the plurality of nodes. When a failed node is detected from the monitoring result, the agreed node (determined node) performs recovery processing and notifies the administrator or the like of the failure of the node.

(3) Each of a plurality of nodes sends a survival report to a predetermined node. Since a failed node is not immediately detected by the predetermined node, the administrator or the like takes action, such as recovery and detection of a failed node, manually with reference to the predetermined node.

The control node detects a failed node in the method of (1), and the determined node that has been agreed detects a failed node in the method of (2). In addition, in the method of (3), the administrator or the like detects a failed node. Therefore, according to the above-described methods of (1) to (3), since a specific node or the administrator performs determination instead of performing determination by the plurality of nodes, it is possible to prevent falling into the split brain state.

In addition, as a related technique, a technique is known in which a computer divides storage nodes into two or more groups based on the attributes collected from a plurality of storage nodes in order to prevent the loss of data in a distributed storage system (for example, refer to International Publication Pamphlet No. WO 2008/114441). In this technique, a computer assigns distributed data and redundant distributed data to each group so that distributed data obtained by distributing data and redundant distributed data obtained by distributing redundant data of the same content as the data are not present in each of the generated groups.

In addition, as another related technique, a technique is known in which a management server configures the same data pool in all storage devices, which store data, and stores different pieces of data so as to be distributed in a plurality of different storage devices within the pool as much as possible (for example, refer to Japanese National Publication of International Patent Application No. 2011-505617).

Further, as still another related technique, a technique is known in which a network monitoring device divides a plurality of nodes in units of a group and obtains a logical line state from one node of the divided group to monitor the logical line (for example, refer to Japanese Laid-open Patent Publication No. 2010-258614).

In addition, as still another related technique, a technique is known in which a network management system includes a group management apparatus that monitors nodes in a group for each group formed based on the apparatus information of each node and information, such as the number of hops (for example, refer to Japanese Laid-open Patent Publication No. 2011-055231).

In the method of (1), since pieces of information of a plurality of nodes are collected in one point (control node), the control node becomes a single point of failure (SPOF). Accordingly, when the control node fails, there is a problem in that the use of the distributed storage system by the client is limited until the control node is restored.

In the method of (2), since a complicated procedure is performed to make an agreement among a plurality of nodes, unnecessary time may be needed until the agreement is made compared with the method of (1). In addition, in the method of (3), since the determination is artificially made by the administrator or the like, long time may be used until a node failure is detected and recovery processing is performed after the occurrence of the node failure, compared with the methods of (1) and (2) described above. That is, in the methods of (2) and (3) described above, there is a problem in that the start of recovery processing on a failed node is slow and accordingly a period for which the use of the distributed storage system by the client is limited becomes long.

In addition, in all of the related techniques described above, the management apparatus manages a plurality of nodes as in the method of (1), and the above-described problems are not taken into consideration.

Thus, in the above-described techniques of determining each state of a plurality of storage devices in a storage system including a plurality of storage devices, there is a problem in that the availability of the storage system is reduced.

The information processing system as a storage system (distributed storage system) has been described so far, but the present invention is not limited thereto. The above-described problems may also occur similarly when each of a plurality of information processing devices included in an information processing system stores different data from the other information processing devices instead of distributed data.

SUMMARY

According to an aspect of the embodiments, an information processing system includes a plurality of information processing devices connected to each other, and communication is performed between the plurality of information processing devices. Each of the plurality of information processing devices includes a processor. The processor included in one of the plurality of information processing devices serving as a first information processing device receives, from each of second information processing devices other than the first information processing device, state information regarding each state of the plurality of information processing devices determined by the second information processing devices, determines each state of the plurality of information processing devices, based on the state information received from each of the second information processing devices, and transmits state information for transmission regarding the determined state of each of the plurality of information processing devices to each of the second information processing devices.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating node state information that a node as an example of the first embodiment transmits and receives;

FIG. 5 is a diagram illustrating node state management information managed by a node as an example of the first embodiment;

FIG. 6 is a diagram illustrating information transmitted from a new node as an example of the first embodiment;

FIG. 7 is a diagram illustrating information received by a new node as an example of the first embodiment;

FIG. 15 is a diagram illustrating party management information managed by a node as an example of the second embodiment;

FIG. 17 is a diagram illustrating node state information that a node as an example of the second embodiment transmits and receives;

FIG. 19 is a diagram illustrating node state management information managed by a node as an example of the second embodiment;

DESCRIPTION OF EMBODIMENTS

Hereinafter, embodiments will be described with reference to the diagrams.

[1] First Embodiment

[1-1] Configuration of a Storage System

Hereinafter, the configuration of a storage system 1 as an example of a first embodiment will be described with reference to FIGS. 1 and 2.

Figure 1:
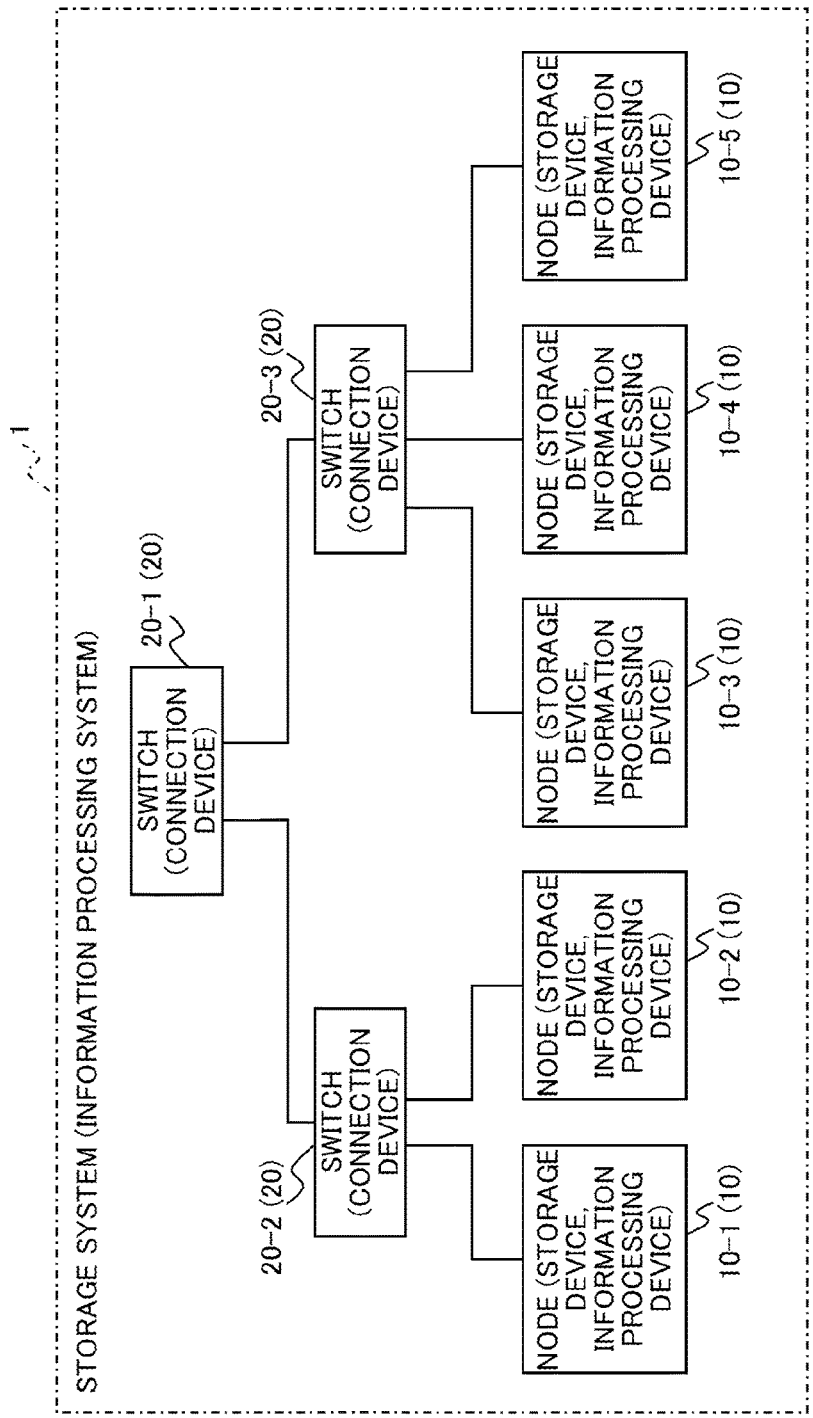
FIG. 1 is a diagram illustrating an example of the configuration of a storage system as an example of a first embodiment.
Figure 2:
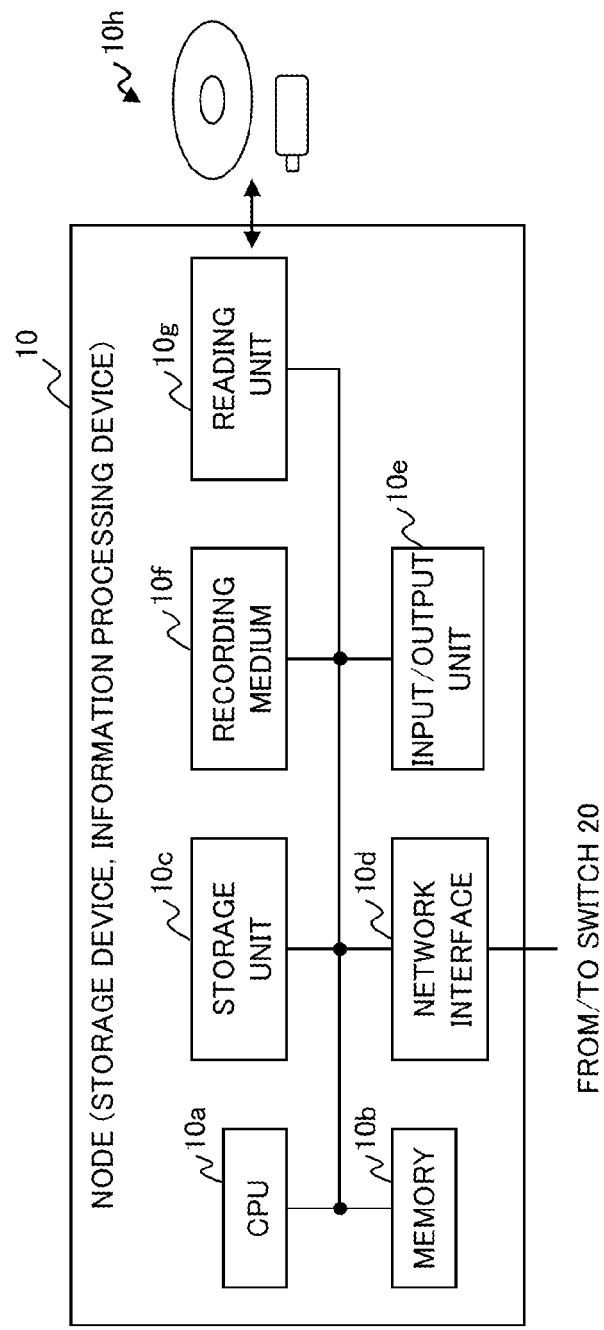
FIG. 2 is a diagram illustrating an example of the hardware configuration of a node as an example of the first embodiment.

FIG. 1 is a diagram illustrating an example of the configuration of the storage system 1 as an example of the first embodiment, and FIG. 2 is a diagram illustrating the hardware configuration of nodes 10-1 to 10-5 illustrated in FIG. 1.

As illustrated in FIG. 1, the storage system (information processing system) 1 according to the first embodiment includes a plurality of (for example, 5) nodes 10-1 to 10-5 and a plurality of (for example, 3) switches 20-1 to 20-3.

In addition, the nodes 10-1 to 10-5 are simply referred to as a node 10 when the nodes 10-1 to 10-5 are not distinguished from each other, and the switches 20-1 to 20-3 are simply referred to as a switch 20 when the switches 20-1 to 20-3 are not distinguished from each other.

In the storage system 1, a storage area network (SAN) is formed by the plurality of nodes 10 and the plurality of switches 20, and communication is performed between the plurality of nodes 10 connected to each other. In addition, the storage system 1 is connected to a client (not illustrated), and provides a storage region (resource) of the node 10 to the client.

Various storage systems that store data so as to be distributed in the plurality of nodes 10, such as a distributed storage system or a cluster file system, can be mentioned as examples of the storage system 1. For example, the storage system 1 may be used for a database of a Web server, cloud storage, and the like.

In addition, each of the plurality of nodes 10 may store data, which is different from other nodes 10, instead of the distributed data.

The node (storage device, node device, information processing device) 10 performs various kinds of processing on a storage unit 10c (refer to FIG. 2), which is included in the node 10, in response to various requests from the client (terminal device (not illustrated)). In addition, as the node 10, an information processing device, such as a personal computer (PC) server, can be mentioned.

As illustrated in FIG. 2, the node 10 includes a central processing unit (CPU) 10a, a memory 10b, the storage unit 10c, a network interface 10d, an input/output unit 10e, a recording medium 10f, and a reading unit 10g. In addition, since the nodes 10-1 to 10-5 can include the same hardware, hardware that the arbitrary node 10 includes will be described hereinbelow.

The CPU 10a is a processing unit (processor) that is connected to the memory 10b, the storage unit 10c, the network interface 10d, the input/output unit 10e, the recording medium 10f, and the reading unit 10g and that performs various kinds of controls and operations. The CPU 10a realizes various functions in the node 10 by executing a program stored in the memory 10b, the storage unit 10c, the recording medium 10f, a recording medium 10h connected to or inserted in the reading unit 10g, or a read only memory (ROM; not illustrated). In addition, an electronic circuit, such as a micro processing unit (MPU) may also be used as a processor without being limited to the CPU 10a.

The memory 10b is a storage device that stores various kinds of data or programs. The CPU 10a stores and expands data or a program in the memory 10b when executing the program. In addition, as the memory 10b, for example, a volatile memory, such as a random access memory (RAM), can be mentioned.

The storage unit 10c is one or more hardware components that store various kinds of data or programs, including a magnetic disk device such as a hard disk drive (HDD), a semiconductor drive device such as a solid state drive (SSD), and a nonvolatile memory such as a flash memory, for example. The storage region of the storage unit 10c is used by the client.

The network interface 10d is a controller that controls connection and communication with the node 10 or the client through the switch 20. As examples of the network interface 10d, a local area network (LAN), a fiber channel (FC), and an interface card based on InfiniBand (registered trademark) can be mentioned. In addition, when conforming to the LAN, it is preferable that the network interface 10d correspond to the internet small computer system interface (iSCSI).

The input/output unit 10e may include at least either an input device, such as a mouse or a keyboard, or an output device, such as a display or a printer, for example. For example, the input/output unit 10e is used for the setting or reference of node information, reference of the log, and other various kinds of work, which will be described later, by the administrator or the like of the storage system 1.

The recording medium 10f is a storage device, such as a flash memory or a ROM, and record various kinds of data or programs. The reading unit 10g is a device that reads data or a program recorded on the computer-readable recording medium 10h, such as an optical disc or a universal serial bus (USB) memory.

A control program to realize the function of the node 10 according to the first embodiment (and a node 10A according to a second embodiment that will be described later) may be stored in at least one of the recording medium 10f and 10h. That is, the CPU 10a realizes the function of the node 10 by expanding the control program, which is output from the recording medium 10f or output from the recording medium 10h through the reading unit 10g, to a storage device, such as the memory 10b, and executing the control program.

In addition, the hardware components described above are communicably connected to each other through a bus. For example, the CPU 10a, the memory 10b, and the network interface 10d are connected to a system bus. In addition, for example, the storage unit 10c, the input/output unit 10e, the recording medium 10f, and the reading unit 10g are connected to the system bus through an input/output (I/O) interface or the like. In addition, the storage unit 10c is connected to the I/O interface, such as a disk interface (DI), through a bus (cable) based on the SCSI, serial attached SCSI (SAS), fiber channel, serial advanced technology attachment (SATA), or the like.

In addition, the above-described hardware configuration of the node 10 is just an example. Therefore, an increase or decrease in the number of hardware components, division of hardware components, and the like in the node 10 may be appropriately performed.

The switch (connection device) 20 is connected between a plurality of nodes 10 or between other switches 20, and relays information, such as a command or data exchanged between the nodes 10 connected to the switch 20. As examples of the switch 20, hardware switches, such as a layer 2 (L2) switch and an FC switch, can be mentioned.

In the storage system 1 illustrated in FIG. 1, the switch 20-1 is connected to the switches 20-2 and 20-3. In addition, the switch 20-2 is connected to the switch 20-1 and the nodes 10-1 and 10-2, and the switch 20-3 is connected to the switch 20-1 and the nodes 10-3 to 10-5. In addition, the switch 20 is not limited to that illustrated in FIG. 1, and may be connected in a multi-stage manner according to the number of nodes 10 or the like, or one switch 20 may be used.

In addition, when a client is connected to the storage system 1 through a network, such as the Internet or an intranet, a router may be interposed between the switch 20 and the client. As examples of the router, not only the software router but also the hardware router, such as a L3 switch, can be mentioned.

[1-2] Explanation on a Node

As described above, the storage system 1 as an example of the first embodiment includes a plurality of nodes 10 connected to each other, and communication is performed between the plurality of nodes 10.

Specifically, each node 10 as an example of the first embodiment performs the following processes of (a) to (c).

(a) A node (first node) 10 of the plurality of nodes 10 receives from each of the nodes (second nodes) 10 other than the node (first node) 10, node state information T1 (refer to FIG. 4) regarding each state of the plurality of nodes 10 determined by the other nodes (second nodes) 10 is received.

(b) The node (first node) 10 determines each state of the plurality of nodes 10 based on the node state information T1 received from each of the other nodes (second nodes) 10.

(c) The node (first node) 10 transmits the node state information T1 regarding each determined state of the plurality of nodes 10 to each of the other nodes (second nodes) 10.

In addition, the state of the node 10 is a type indicating whether or not the node 10 operates normally, and details thereof will be described later.

The node 10 repeats the processes of (a) to (c) described above. That is, each node 10 transmits the node state information T1 determined (generated) by the node 10 to each of the other nodes 10 periodically as a heartbeat indicating that the node is operating normally. In addition, each node 10 receives the node state information T1 transmitted as a heartbeat from the other nodes 10, and updates management information stored in the node 10. Accordingly, since the state of each node 10 is shared between the plurality of nodes 10 in the storage system 1, the node 10 can determine each state of the plurality of nodes 10 autonomously based on the node state information T1 from the other nodes 10.

In addition, in the storage system 1, the connection form of the plurality of nodes 10 is not limited to that illustrated in FIG. 1, and latency, packet loss, and the like may occur in transmission and reception of the node state information T1 as a distance between the plurality of nodes 10 increases. Therefore, in the storage system 1, it is preferable that the network quality in the plurality of nodes 10, to and from which the node state information T1 is transmitted and received, be uniform.

[1-3] Configuration of a Node

Next, the configuration of the node 10 as an example of the first embodiment will be described with reference to FIGS. 3 to 10.

Figure 3:
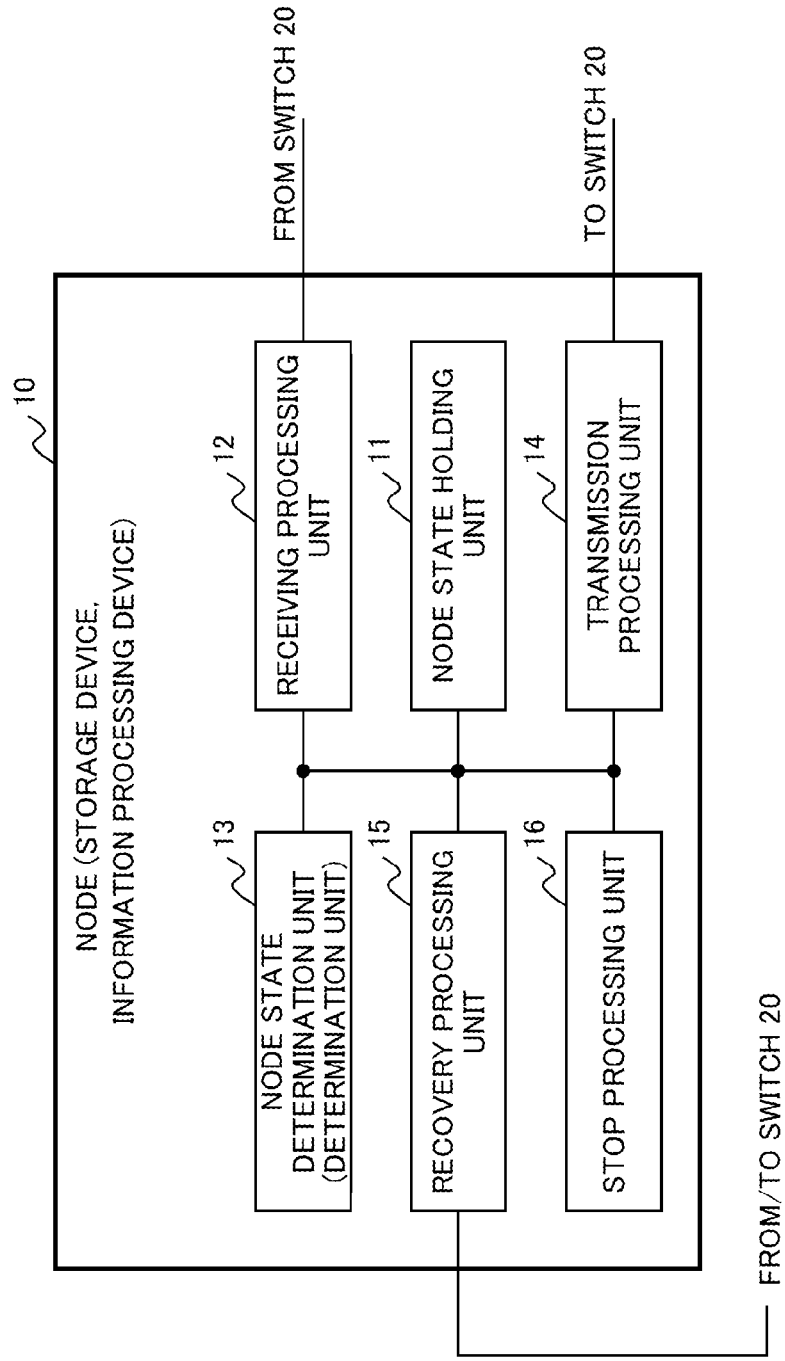
FIG. 3 is a diagram illustrating an example of the functional configuration of a node as an example of the first embodiment.

FIG. 3 is a diagram illustrating an example of the functional configuration of the node 10 as an example of the first embodiment. FIG. 4 is a diagram illustrating the node state information T1 that the node 10 transmits and receives, and FIG. 5 is a diagram illustrating node state management information T2 managed by the node 10 (especially, the node 10-1).

As illustrated in FIG. 3, in order to perform the process described above, the node 10 includes a node state holding unit 11, a reception processing unit 12, a node state determination unit 13, a transmission processing unit 14, a recovery processing unit 15, and a stop processing unit 16. In addition, since the nodes 10-1 to 10-5 can have the same function, a function of the arbitrary node 10 will be described hereinbelow.

[1-3-1] Node State Holding Unit

The node state holding unit 11 is a storage region for holding the node state management information T2 illustrated in FIG. 5, and is realized by the memory 10b described above, for example.

[1-3-2] Reception Processing Unit

The reception processing unit 12 performs the process of (a) described above. Specifically, the reception processing unit 12 receives the node state information T1 illustrated in FIG. 4 from each of the nodes 10 other than the node 10 of the plurality of nodes 10, and updates the node state management information T2 (refer to FIG. 5) held in the node state holding unit 11.

The node state information (state information) T1 is information including the state of each node 10 determined by the node 10 of the transmission source. For example, the state of each node 10 determined by the node 10 is included in the node state information T1 transmitted from the node 10, and the state of each node 10 determined by the other nodes 10 which are transmission sources of the received node state information is included in the node state information T1 received by the node 10. In addition, the node 10 can generate the node state information T1 as a table as illustrated in FIG. 4 and transmit and receive the table.

As illustrated in FIG. 4, the node state information T1 includes a node ID that is an example of identification information of the node 10, a state of each node 10, an internet protocol (IP) address that is an example of the address of the node 10, and a port number of the node 10. The node state information T1 illustrated in FIG. 4 includes states of node IDs "1" to "5" corresponding to the nodes 10-1 to 10-5.

As an example, a state "Alive", an IP address "192.168.0.1", and a port number "12345" are matched with the node ID "1".

In addition, although the node ID has been mentioned as an example of the identification information of the node 10, the identification information of the node 10 is not limited thereto. It is preferable that the identification information be unique information that can specify each node 10. For example, a serial number or IP address of the node 10 or a media access control (MAC) address of the network interface 10d may also be used as the identification information.

In addition, although the IP address has been mentioned as an example of the address of the node 10, the address of the node 10 is not limited thereto. As the address, it is also possible to use various addresses, which can specify the node 10 in a protocol, other than the IP.

The node state management information T2 is information to manage each state of the plurality of nodes 10 determined by the node 10 and the other nodes 10. For example, the node state management information T2 includes information regarding how the node 10 determines the state of each node 10, how the other nodes 10 determine each node 10, and finally when the node state information T1 as a heartbeat has been received from each node 10. In addition, the node 10 can generate the node state management information T2 as a table as illustrated in FIG. 5 and manage the table.

Hereinafter, in the explanation of FIG. 5, the node 10 is assumed to be the node 10-1.

As illustrated in FIG. 5, the node state management information T2 includes a node ID as an example of identification information of the node 10, a state of each node 10, an IP address as an example of the address of the node 10, and a port number of the node 10, similar to the node state information T1 illustrated in FIG. 4. In addition, the node state management information T2 further includes a state (written as "by 2" to "by 5" in FIG. 5) of each node 10 included in the node state information T1 received from the other nodes 10 and last update information of each of the other nodes 10. The node state management information T2 illustrated in FIG. 5 includes states of the node IDs "1" to "5" corresponding to the nodes 10-1 to 10-5.

As an example, a state "Alive" determined by the node 10-1, a state "Alive" determined by each of the other nodes 10-2 to 10-5, last update information "1 sec ago" (1 second ago), an IP address "192.168.0.1", and a port number "12345" are matched with the node ID "1". That is, each state of the plurality of nodes 10 indicated by the node state information T1 received by the reception processing unit 12 is included in the node state management information T2. In addition, self-state information relevant to the node state information T1 regarding the state of the node 10 including the node state determination unit 13 is included in the node state management information T2.

When the node state information T1 is received from each of the other nodes 10, the reception processing unit 12 sets the state of each node 10, which is included in the received node state information T1, in each column of the corresponding other nodes 10 in the node state management information T2. That is, the states of "by 2" to "by 5" (when the node 10 is the node 10-1) illustrated in FIG. 5 are set based on the information from the corresponding other nodes 10. In addition, the state of the node ID "4" will be described later.

In addition, when the node state information T1 is received from the node 10-2, the reception processing unit 12 of the node 10-1 sets the state of each node 10, which is included in the node state information T1, in the column of "by 2" in the node state management information T2. In addition, the reception processing unit 12 updates the last update information of the node ID "2" corresponding to the node 10-2.

In addition, the last update information is information indicating when a heartbeat was received last. In the example illustrated in FIG. 5, a difference between the current time and the time at which last reception was performed (last reception time) is illustrated as the last update information, the last update information is not limited thereto. For example, the node 10 may update the last update information by setting the last reception time itself as the last update information. In addition, the node 10 may execute a timer whose value changes (for example, increases) with the passage of time for each node 10 and refer to the corresponding timer value in the last update information of the node state management information T2. When a timer value is used as the last update information, the node 10 can update the last update information by resetting the count value of the timer when updating the last update information.

The reception processing unit 12 may update the node state management information T2 based on the received node state information T1 whenever the node state information T1 is received from the other nodes 10. In addition, the reception processing unit 12 may store the received node state information T1 in the memory 10*b* or the like so as to match the identification information of the node 10 of the transmission source, and update the node state management information T2 based on the node state information T1 stored in the memory 10*b* every first predetermined time to be described later.

In addition, the reception processing unit 12 can receive the IP address and the port number of the node 10 in addition to the above-described reception of the node state information T1.

FIG. 6 is a diagram illustrating information transmitted from the new node 10 as an example of the first embodiment transmits, and FIG. 7 is a diagram illustrating information received by the new node 10.

After startup, that is, when the node 10 (transmission processing unit 14 to be described later) is added to the storage system 1, the node 10 (transmission processing unit 14 to be described later) notifies all nodes of information including the IP address and the port number of the node 10. Specifically, the node (new node) 10 added to the storage system 1 notifies all nodes 10 in the storage system 1 of transmission information T3 illustrated in FIG. 6 by broadcasting or the like.

As illustrated in FIG. 6, the transmission information T3 transmitted from the new node 10 includes a node ID as an example of identification information of the new node 10, a state of the new node 10, an IP address as an example of the address of the new node 10, and a port number of the new node 10. For example, the transmission information T3 illustrated in FIG. 6 includes a state of the node ID "6" corresponding to the new node 10.

As an example, a state "Alive", an IP address "192.168.0.6", and a port number "12345" determined by the new node 10 are matched with the node ID "6".

When the transmission information T3 is notified from the added new node 10, each reception processing unit 12 of the other nodes 10 adds information of the IP address, the port number, and the node ID of the transmission source, which are included in the transmission information T3, to the node state management information T2. Then, the node 10 (transmission processing unit 14) also transmits a heartbeat for the IP address and the port number of the added new node 10.

In addition, the new node 10 (reception processing unit 12) receives heartbeats (node state information T1') sequentially from the other nodes 10 that have received the transmission information T3 notified from the new node 10. In addition, although the node state information T1' received by the new node 10 has the same data structure as the node state information T1 illustrated in FIG. 4, an expression as the node state information T1' is used for convenience since the information of the new node 10 is added.

As illustrated in FIG. 7, the node state information T1' received by the new node 10 includes a state of the node ID "6" corresponding to the new node 10 in addition to the node state information T1 illustrated in FIG. 4. As an example, a state "Alive", an IP address "192.168.0.6", and a port number "12345" of the new node 10 determined by the other nodes 10 are matched with the node ID "6".

The new node 10 (reception processing unit 12) generates or updates the node state management information T2 from the IP address and the port number of each of the other nodes 10 included in the received node state information T1' and the information of the node ID of the transmission source. As a result, the new node 10 can start the service of the transmission processing unit 14 to transmit the node state information T1' periodically as a heartbeat.

[1-3-3] Node State Determination Unit

The node state determination unit (determination unit) 13 performs the process of (b) described above. Specifically, the node state determination unit 13 determines the state of each node 10 with reference to the node state management information T2, and sets the state in the node state management information T2. More specifically, the node state determination unit 13 determines each state of the plurality of nodes 10 based on each state of the plurality of nodes 10, which is indicated by the node state information T1 received by the reception processing unit 12, and the reception status of the node state information T1 from each of the other nodes 10.

Here, the state and state transition of the node 10 will be described.

Figure 8:
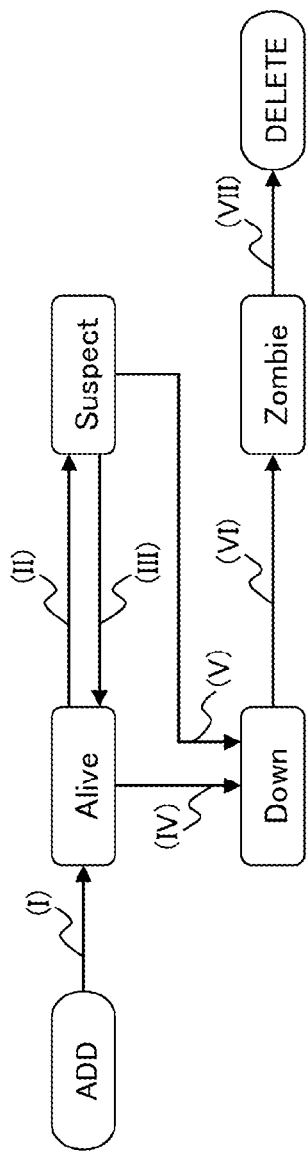
FIG. 8 is a diagram illustrating an example of a state transition when a node as an example of the first embodiment determines each state of other nodes.
Figure 9:
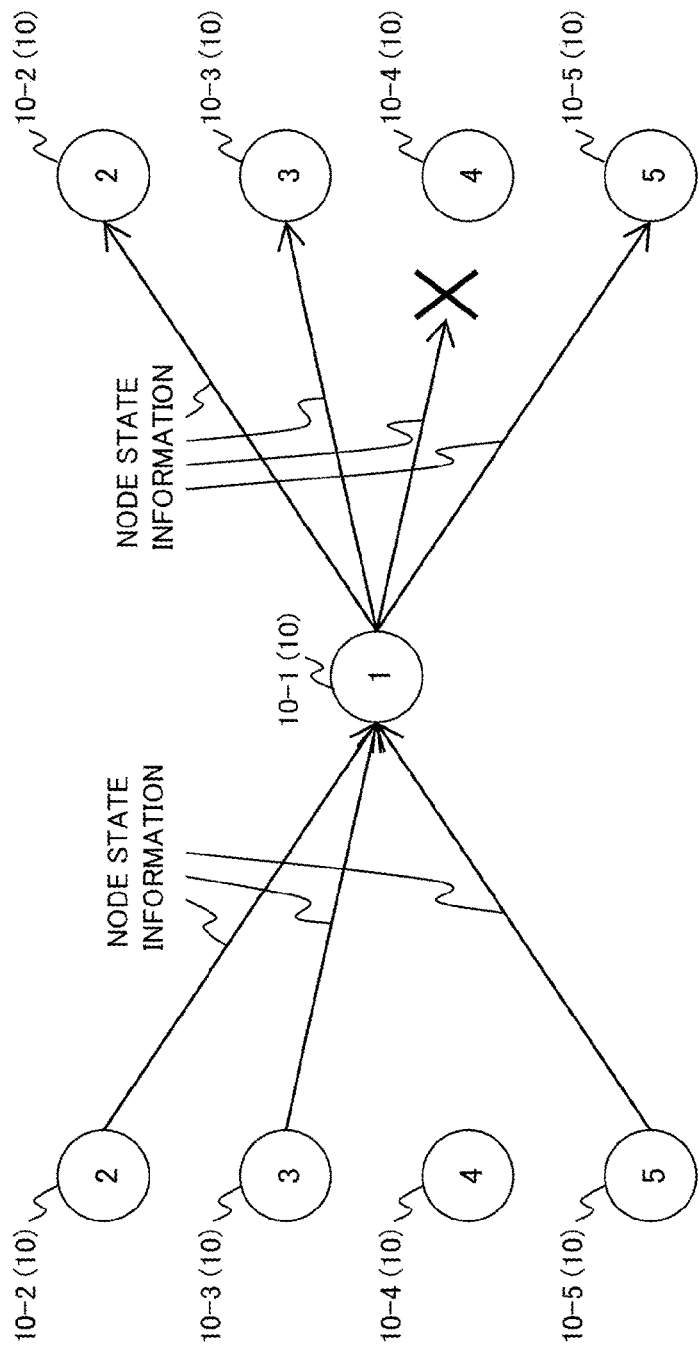
FIG. 9 is a diagram illustrating an example of the process of transmitting and receiving node state information by a plurality of nodes as an example of the first embodiment.
Figure 10:
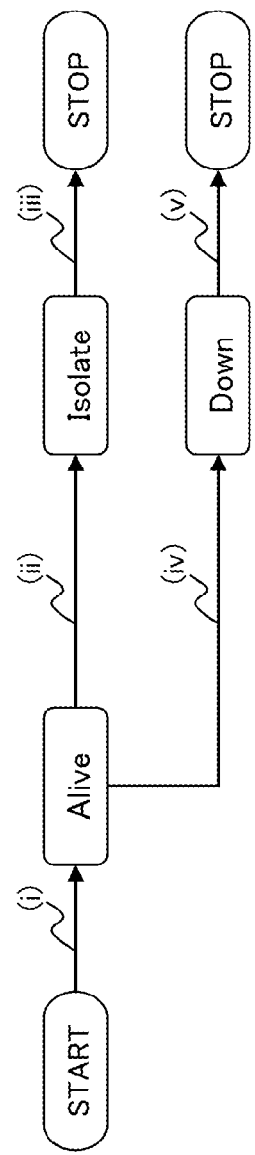
FIG. 10 is a diagram illustrating an example of a state transition when a node as an example of the first embodiment determines the state of the node.

FIG. 8 is a diagram illustrating an example of the state transition when the node 10 as an example of the first embodiment determines each state of the other nodes 10, and FIG. 9 is a diagram illustrating an example of a process of transmitting and receiving the node state information T1 by the plurality of nodes 10. FIG. 10 is a diagram illustrating an example of the state transition when the node 10 determines the state of the node 10.

In addition, in the example illustrated in FIG. 9, only a connection state between the nodes 10 is illustrated and the switch 20 is not illustrated for simplicity of explanation.

[1-3-3-1] Explanation Regarding Each State of the Other Nodes 10 Determined by a Node State Determination Unit First, each state of the other nodes 10 determined by the node 10 (node state determination unit 13) will be described. As illustrated in FIG. 8, states of the other nodes 10 determined by the node 10 include Alive, Suspect, Down, and Zombie.

Alive indicates a state in which the node 10 is operating normally (under operation). The node state determination unit 13 determines each state of the other nodes 10, of which last update information is within the second predetermined time and which are not determined to be in the state of Suspect by a first predetermined number of nodes 10 or more, to be Alive with reference to the node state management information T2.

In addition, when the other nodes 10 are added to the storage system 1, the node state determination unit 13 determines each state of the other nodes 10 added to be Alive, which is an initial state, in the first determination regarding the other nodes 10 added (refer to the arrow (I) in FIG. 8).

Here, a time equal to or longer than the first predetermined time, which is a time period when the node 10 transmits the node state information T1, can be set as the second predetermined time. For example, when each node 10 transmits the node state information T1 every second (every first predetermined time), the second predetermined time can be set to time (for example, 20 seconds) of about several to several tens of times in consideration of delay of the transmission process, congestion of the communication path, and the like due to the load of the node 10.

In addition, for example, a majority can be set as the first predetermined number.

The following explanation will be given on the assumption that the first predetermined time is 1 second, the second predetermined time is 20 seconds, and the first predetermined number is a majority of the number of nodes 10.

Suspect (first state) indicates a state (possibility of stop) in which the node 10 is suspected to have failed (stopped). The node state determination unit 13 determines each state of the other nodes 10 whose last update information is before the second predetermined time, that is, each state of the other nodes 10 that have not received the node state information T1 within the second predetermined time, to be Suspect with reference to the node state management information T2. That is, the node state determination unit 13 determines each state of the other nodes 10, in which heartbeat non-arrival time exceeds a threshold value (second predetermined time), to be Suspect.

For example, when the node state information T1 is not received from the other nodes 10 determined to be in the state of Alive longer than 20 seconds, the node state determination unit 13 makes each state of the other nodes 10 transition from Alive to Suspect (refer to the arrow (II) in FIG. 8).

In addition, the node state determination unit 13 may receive the node state information T1 from the other nodes 10 before each state of the other nodes 10 determined to be in the state of Suspect is determined to be Down by the node 10 or the other nodes 10. In this case, the node state determination unit 13 makes each state of the other nodes 10 transition from Suspect to Alive (refer to the arrow (III) in FIG. 8).

Down (second state) indicates a state in which a failure has occurred in the node 10 (node 10 has been stopped). The node state determination unit 13 determines each state of the other nodes 10, which are determined to be in the state of Suspect by a first predetermined number of nodes 10 or more, or each state of the other nodes 10, which are determined to be in the state of Down by at least one of the other nodes 10, to be Down.

For example, each state of the other nodes 10 determined to be in the state of Alive or Suspect by the node state determination unit 13 may be determined to be Suspect by the majority of nodes 10 or more, or may be determined to be Down by any of the other nodes 10. In this case, the node state determination unit 13 determines each state of the other nodes 10, which are determined to be in the state of Alive or Suspect, to be Down (refer to the arrow (IV) or (V) in FIG. 8).

As an example, as illustrated in FIG. 9, a case is considered in which the node 10-1 receives the node state information T1 from the nodes 10-2, 10-3, and 10-5 every second and does not receive the node state information T1 from the node 10-4 for 30 seconds. In this case, the node state management information T2 is in the state illustrated in FIG. 5.

That is, since the node state information T1 is not received from the node 10-4 longer than 20 seconds, the node 10-1 determines the state of the node 10-4 to be Suspect. In addition, since the other nodes 10-3 and 10-5 do not receive the node state information T1 from the node 10-4 longer than 20 seconds, the other nodes 10-3 and 10-5 also determine the state of the node 10-4 to be Suspect. In this case, since the state of the node 10-4 is determined to be Suspect by the majority of nodes 10, the node state determination unit 13 makes the state of the node 10-4 transition to Down.

Thus, when a failure or the like occurs in the other nodes 10, each state of the other nodes 10 in which a failure or the like has occurred transitions to Suspect sequentially in the row direction (horizontal axis direction in FIG. 5) of the node ID of the other nodes 10 in the node state management information T2 (refer to node ID "4" in FIG. 5). Then, the node state determination unit 13 determines each state of the other nodes 10 to be Down when the number of nodes 10 that have become Suspect reaches a majority.

In addition, in the example illustrated in FIG. 9, the node 10-1 transmits the node state information T1 to the nodes 10-2 to 10-5, but the node state information T1 is not received by the node 10-4 since the node 10-4 is in a failure (stop) state (or suspected to be in a failure (stop) state).

Zombie (third state) indicates a state in which recovery processing is performed in the node 10 by the recovery processing unit 15 to be described later (under recovery processing). Zombie is a provisional state until the node information of the failed node 10 is deleted after a failure has occurred in the node 10. The nodes 10 other than the node 10 related to the client and recovery processing are restricted to access the node 10 in the state of Zombie.

Specifically, in the storage system 1, recovery processing on the failed node 10 is performed by the node 10 having data relevant to the data held in the failed node 10. As described above, the recovery processing is a process of recovering the multiplexing state of the data by copying redundant data to the other nodes 10 from the node 10 that holds redundant data of the data in the failed node 10.

For example, there may be a case where the failed node 10 is recovered or added to the storage system 1 in the same node name during the recovery processing of the recovery processing unit 15. In this case, in a state where old data is present in the failed node 10 in the storage system 1, a state occurs in which recovery processing is performed separately from the old data. This may destroy the consistency of the data.

Although the client holds a table to manage in which node 10 of the storage system 1 data is stored, the occurrence of a failure in the node 10 is not detected immediately in this table. If the client acquires data (old data) from the failed node 10, inconsistency occurs between the acquired data and redundant data copied to the other nodes 10 after recovery processing.

For these reasons, the node state determination unit 13 determines the state of the failed node 10 to be Zombie until recovery processing is completed (old data is deleted). Then, the node state determination unit 13 does not allow the nodes 10 other than the node 10 relevant to the recovery processing and the client to access the node 10 in the state of Zombie, thereby preventing the consistency of the data from being destroyed. Therefore, the period of the state of Zombie can be said to be a guard period to suppress the reading of old data from the failed node 10 until the recovery processing is completed.

The node state determination unit 13 determines each state of the other nodes, which are determined to be in the state of Down by a second predetermined number of nodes 10 or more, to be Zombie.

Here, a number equal to or greater than the first predetermined number, preferably, the number of all nodes 10 can be set as the second predetermined number. The following explanation will be given on the assumption that the second predetermined number is the number of all nodes 10.

For example, the node state determination unit 13 makes the state of the node 10, which is determined to be in the state of Down by all nodes 10 (except for the node 10 in the state of Down or Zombie) including the node 10, transition from Down to Zombie (refer to the arrow (VI) in FIG. 8).

By setting the node 10, which is determined to be in the state of Down by all nodes 10, to Zombie, the node state determination unit 13 can reliably determine the failed node 10 to be the node 10 to be recovered by consensus of all nodes 10.

In addition, when the recovery processing is completed, the node state determination unit 13 of the node other than the failed node 10 deletes information regarding the failed node 10 from the node state management information T2 held in the node 10 (refer to the arrow (VII) in FIG. 8).

As described above, the node state determination unit 13 determines each state of the plurality of nodes 10 based on each state of the plurality of nodes 10, which is indicated by the node state information T1 received by the reception processing unit 12, and "information from other nodes" in the node state management information T2 in FIG. 5.

In addition, the node state determination unit 13 may determine each state of the plurality of nodes 10 based on additional self-state information (refer to "determination in the node" in FIG. 2) that is a result of determination regarding the state of the node 10 including the node state determination unit 13, as will be described below.

[1-3-3-2] Explanation Regarding Each State of the Node Determined by a Node State Determination Unit Next, each state of the node 10 determined by the node 10 (node state determination unit 13) will be described. As illustrated in FIG. 10, states of the node 10 determined by the node 10 include Alive, Isolate, and Down.

Alive (initial state) is the same state as Alive when the node state determination unit 13 determines the other nodes 10, and indicates a state in which the node 10 is operating normally (under operation).

When the node 10 starts, the node state determination unit 13 determines the state of the node 10 to be Alive in the first determination regarding the node 10 (refer to the arrow (i) in FIG. 10).

Isolate (fourth state) indicates a state in which the node 10 is isolated from the storage system 1. As examples of the state of Isolate, a case where a failure occurs in the path from the node 10 to the switch 20, a case where the network interface 10d of the node 10 fails, and the like can be mentioned.

When the node state information T1 is not received from a third predetermined number of other nodes 10 or more within the second predetermined time, the node state determination unit 13 makes the state of the node 10 transition from Alive to Isolate with reference to the node state management information T2. That is, the node state determination unit 13 determines the state of the node 10 to be Isolate when the number of nodes 10, in which the heartbeat non-arrival time exceeds a threshold value (second predetermined time), is equal to or greater than the third predetermined number.

Here, similar to the first predetermined number, for example, a majority of the number of nodes 10 can be set as the third predetermined number.

The following explanation will be given on the assumption that the third predetermined number is a majority of the number of nodes 10.

For example, the node state determination unit 13 makes the state of the node 10 transition to Isolate when the number of nodes 10, in which the heartbeat non-arrival time exceeds a threshold value, reaches a majority (refer to the arrow (ii) in FIG. 10).

In addition, when the node 10 is isolated from the storage system 1 due to path failure or the like, the reception processing unit 12 does not receive a heartbeat from the other nodes 10. As a result, in the node state management information T2, the state of each node 10 determined by the node 10 transitions to Suspect sequentially in the column direction (vertical axis direction in FIG. 5). Then, the node state determination unit 13 determines the state of the node 10 to be Isolate when the number of nodes 10 have become Suspect reaches a majority.

In addition, when the state of the node 10 transitions to Isolate, the node 10 is stopped by stop processing of the stop processing unit 16 to be described later (refer to the arrow (iii) in FIG. 10).

Incidentally, when the state of the node 10 transitions to Isolate, it is not possible to tell the other nodes that the state of the node 10 is Isolate through the node state information T1 since the node 10 is isolated from the storage system 1. In addition, also when each state of the other nodes 10 transitions to Isolate, it is not possible to detect that the states of the other nodes 10 have transitioned to Isolate through the node state information T1 since the other nodes 10 are isolated from the storage system 1.

When the state of the node 10 transitions to Isolate, a transition in order of Suspect, Down, and Zombie as a state of the node 10 occurs in the node state information T1 exchanged between the other nodes 10. In other words, when the node 10 determines each state of the other nodes 10 to be Suspect, Down, or Zombie, each state determined by the other nodes 10 themselves may be Isolate.

Down (second state) is the same state as Down determined for the other nodes 10 by the node state determination unit 13, but the contents of determination until the state transitions to Down are different from those in the case of determination for the other nodes 10. The node 10 (for example, the node state determination unit 13) makes the state of the node 10 transition from Alive to Down when it is detected that a predetermined failure has occurred in the node 10.

For example, the predetermined failure is a failure for which a recovery by the node 10 is not possible or is difficult, and a hardware failure and the like can be mentioned. In addition, since the detection of the occurrence of a failure in the node 10 by the node 10 can be performed using various kinds of known methods, explanation thereof will be omitted.

The node state determination unit 13 determines the state of the node 10 to be Down when, for example, an unrecoverable failure occurs in the node 10 (refer to the arrow (iv) in FIG. 10).

In addition, when the state of the node 10 transitions to Down, the node 10 is stopped by stop processing of the stop processing unit 16 to be described later (refer to the arrow (v) in FIG. 10).

In addition, when the node 10 determines the state of the node 10 to be Isolate or Down, the state of the node 10 determined by the other nodes 10 transitions in order of Suspect, Down, and Zombie.

When the state of the node 10 is determined to be Zombie by the other nodes 10, as described above, recovery processing on the node 10 is performed and information regarding the node 10 is deleted from the node state management information T2 held in the nodes 10 other than the node 10 as described above.

As described above, the node state determination unit 13 determines the states of the node 10 and the other nodes 10 and updates the node state management information T2.

Specifically, the node state determination unit 13 sets the state determined for each of the node 10 and the other nodes 10 in the column of "state" in the node state management information T2 illustrated in FIG. 5.

The node state determination unit 13 can determine each state of the plurality of nodes 10 based on the node state management information T2 as described above. That is, the node state determination unit 13 performs the above-described determination based on each state of the plurality of nodes 10, which is indicated by the node state information T1 received by the reception processing unit 12, and self-state information relevant to the node state information T1 regarding the state of the node 10 including the node state determination unit 13.

In addition, the above-described determination by the node state determination unit 13 may be performed simultaneously for all nodes 10 every first predetermined time, or may be performed every first predetermined time at different timing for each node 10.

In addition, when the state of the node 10 is determined to be Down or Isolate by the node state determination unit 13, the node 10 may store the node state management information T2, which is held in the node state holding unit 11, in a nonvolatile memory, such as the recording medium 10f. In this manner, the operator or the like can determine whether the cause of stop of the node 10 is a failure (Down), for which a recovery is not possible or is difficult, or is isolation from the storage system 1 (Isolate) after recovery processing. As a result, a failure recovery can be performed rapidly.

[1-3-4] Transmission Processing Unit

The transmission processing unit 14 performs the process of (c) described above. Specifically, the transmission processing unit 14 transmits the node state information T1 regarding each state of the plurality of nodes 10, which is determined by the node state determination unit 13, to each of the other nodes 10 every first predetermined time.

More specifically, the transmission processing unit 14 acquires an IP address and a port number with reference to the node state management information T2 and determines a destination node of the node state information T1 transmitted to the other nodes 10. In addition, the transmission processing unit 14 generates the node state information T1 from the information of the node ID, state, IP address, and port number for each node 10 determined by the node 10 with reference to the node state management information T2. In addition, the transmission processing unit 14 transmits the generated node state information T1 to each of the other nodes 10 as a heartbeat.

Although the node state information T1 received by the reception processing unit 12 and the node state information T1 transmitted from the transmission processing unit 14 have the same data structure, the node state information T1 transmitted from the transmission processing unit 14 may be called node state information for transmission (state information for transmission) T1 hereinafter for the sake of convenience.

Moreover, in addition to the transmission of the node state information T1, the transmission processing unit notifies all nodes 10 in the storage system 1 of the transmission information T3 (refer to FIG. 6) by broadcasting or the like after starting of the node 10 as described above.

[1-3-5] Recovery Processing Unit

The recovery processing unit 15 performs recovery processing on the other nodes 10. Specifically, the recovery processing unit 15 performs recovery processing on the node 10 determined to be Zombie by the node state determination unit 13.

In addition, the recovery processing may be performed by the node 10, which is relevant to the node 10 determined to be Zombie in the node state management information T2, instead of being performed by all nodes 10.

For example, the recovery processing unit 15 of the node 10 that holds redundant data or related data of data in the node 10 determined to be Zombie may copy the redundant data or the related data to the storage unit 10c of the other nodes 10. Alternatively, the recovery processing unit 15 of the node 10 to which the above-described redundant data or related data is to be copied may acquire the data from the node 10, which holds the redundant data or the related data, and store the redundant data or the related data in the storage unit 10c of the node 10 or the like.

When the copy is completed in the recovery processing, the recovery processing unit 15 deletes the data in the node 10 determined to be Zombie and ends the recovery processing. In addition, for example, when the node 10 determined to be Zombie is stopped, there is a possibility that the recovery processing unit 15 is not able to delete the data in the node 10 determined to be Zombie. In this case, the recovery processing unit 15 may end the recovery processing without deleting the data in the node 10 determined to be Zombie. In addition, when the recovery processing is completed, the recovery processing unit 15 notifies the node state determination unit 13 of the completion of recovery processing.

When the completion of recovery processing is notified, the node state determination unit 13 deletes the node ID regarding the node 10 determined to be Zombie and the state, last update information, IP address, and port number, which are determined by the node 10 and each node 10, from the node state management information T2. As a result, each node 10 can completely isolate the node 10 determined to be Zombie from the storage system 1.

In addition, the node 10 whose information has been deleted from the node state management information T2 is started, for example, when the node 10 is changed to a state where the node 10 can be included in the storage system 1 again due to repair or replacement by an operator or the like, and determines the state of the node 10 to be Alive (refer to the arrow (i) in FIG. 10). In this case, as described above, the new node 10 notifies the other nodes 10 of the IP address and the port number, and the information of the new node 10 is added to the node state management information T2 of each node 10. As a result, the new node 10 changes to a usable state.

Incidentally, during the operation of the storage system 1, the operator or the like recovers the failed node 10 by initializing information, which is held in the node in which a failure has occurred (failed node) 10, or replacing the failure location or the like (in the case of replacement of all nodes 10 or a component). In addition, the operator or the like makes the recovered failed node 10 be included in the storage system 1 again so that the other nodes 10 can recognize the recovered failed node 10 as a new node 10. Therefore, it is possible to recover the multiplicity of data regarding the failed node 10 and the redundancy of the node 10, which have been lowered due to a failure.

In addition, since the IP address that has been used by the failed node 10 before recovery is deleted from the node state management information T2 of the other nodes 10, the same IP address can be used for the failed node 10 after the recovery even after the failed node 10 is included in the storage system 1 again. Therefore, the administrator of the storage system 1 can manage the IP address in the storage system 1 easily, and this improves the convenience.

[1-3-6] Stop Processing Unit

The stop processing unit 16 performs a process of stopping the node 10 when a predetermined failure occurs in the node 10 and the node state determination unit 13 determines the state of the node 10 to be Down or when the node state determination unit 13 determines the state of the node 10 to be Isolate.

In addition, it is preferable that the stop processing of the stop processing unit 16 be performed after the recovery processing of the recovery processing unit 15 is completed, specifically, after data in the failed node 10 is deleted in the recovery processing.

In addition, each recovery processing unit 15 of the other nodes 10 may perform a process of stopping the failed node 10 after recovery processing on the failed node 10 is completed or during the recovery processing. In this case, the stop processing unit 16 can be omitted.

As described above, according to the storage system as an example of the first embodiment, heartbeat communication is performed between the nodes 10 in the shape of a mesh by the plurality of nodes 10. Each state of the plurality of nodes 10 determined by each node 10 is included in a heartbeat, and each state of the node 10 is shared between the plurality of nodes 10.

Therefore, in the storage system 1, a highly reliable determination result for the state of each node 10 can be obtained based on the determination result of each state of the other nodes 10 that is autonomously determined by each node 10. That is, when a specific node, a monitoring device, or the like monitors the state of a node centrally, erroneous determination regarding the states of other nodes may be made by the specific node or the like. In contrast, according to the storage system 1, since each node 10 can determine the states of the node 10 and the other nodes 10 in consideration of the state of each node 10 as seen from the plurality of nodes 10, it is possible to prevent erroneous determination made by a specific node or the like.

In addition, since each node 10 can share determination results and obtain a highly reliable determination result, it is possible to prevent falling into the split brain state. In addition, even if the node 10 falls into the split brain state, the node 10 is stopped autonomously when the node 10 changes to Isolate. Accordingly, it is possible to suppress the occurrence of inconsistency of redundant data.

Further, since each node 10 shares the state of the node 10 using a simple method, such as a heartbeat, it is possible to determine the states of the node 10 and the other nodes 10 easily at high speed compared with conventional methods.

Therefore, for example, since each node 10 can detect the failed node 10 at high speed, it is possible to reduce the stopping time of the access to the storage system from the client or to reduce the time for which the reliability is lowered.

[1-4] Example of Operation

Figure 11:
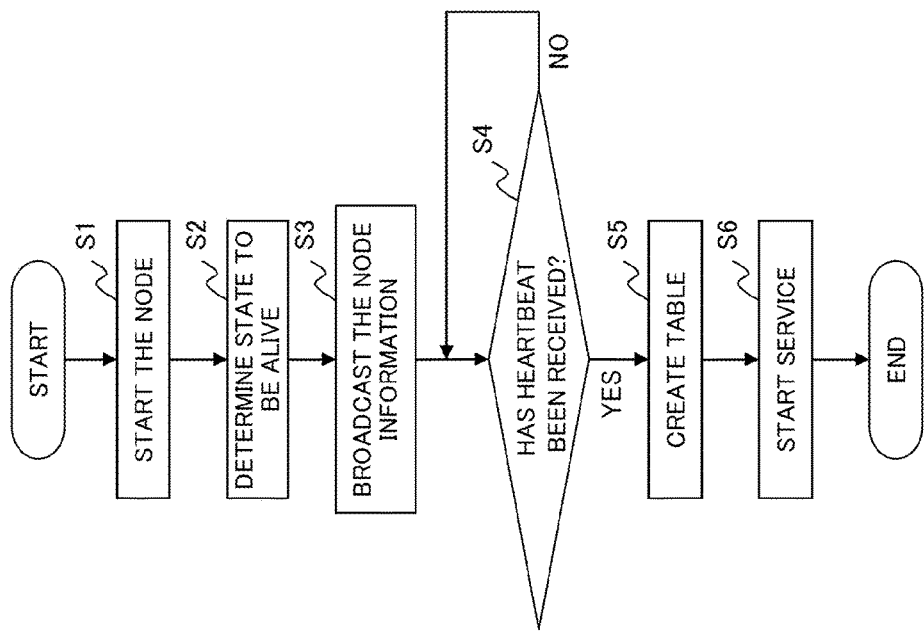
FIG. 11 is a flow chart illustrating an example of the operation after starting of a new node as an example of the first embodiment.
Figure 12:
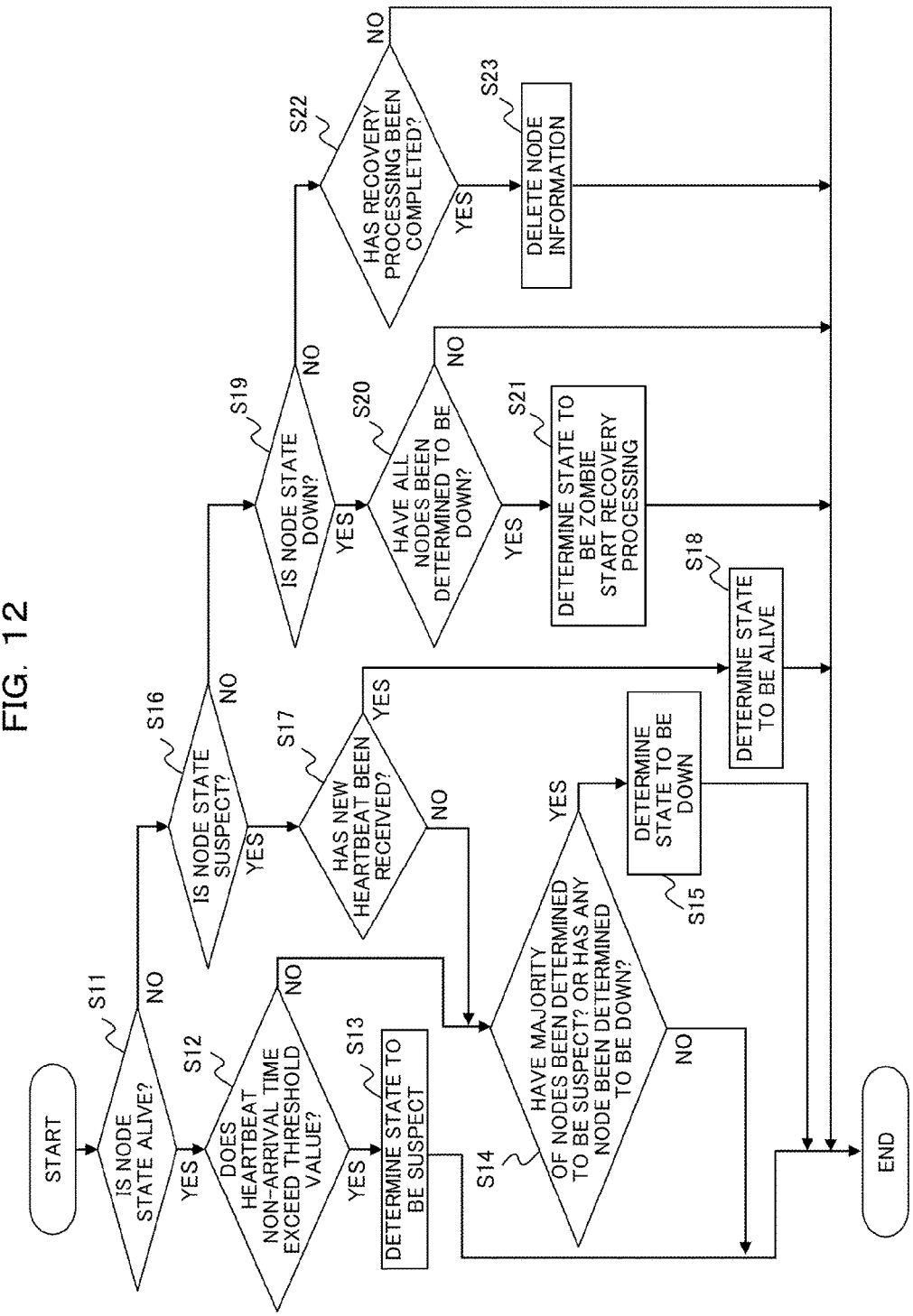
FIG. 12 is a flow chart illustrating an example of the operation when a node as an example of the first embodiment determines each state of other nodes.
Figure 13:
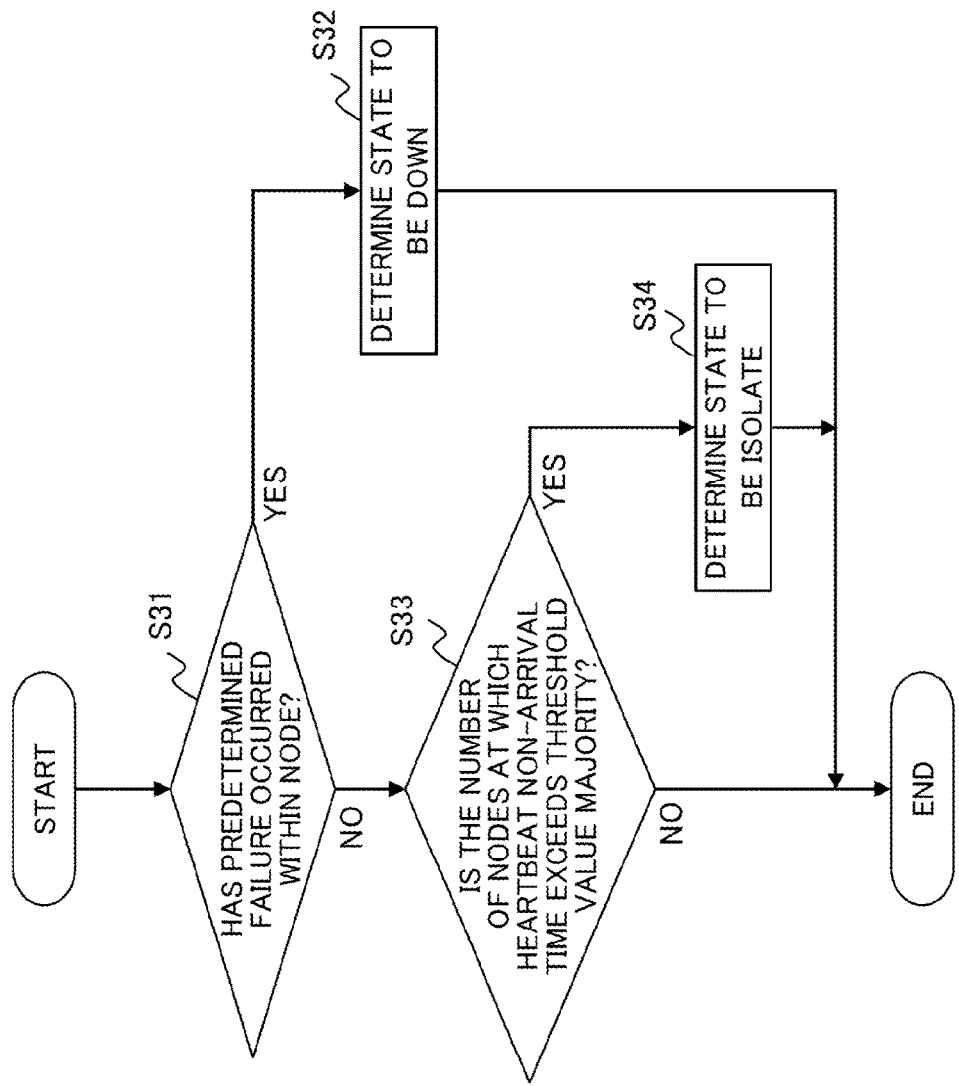
FIG. 13 is a flow chart illustrating an example of the operation when a node as an example of the first embodiment determines the state of the node.

Next, an example of the operation of the node 10 as an example of the first embodiment configured as described above will be described with reference to FIGS. 11 to 13. FIG. 11 is a flow chart illustrating an example of the operation after starting of the new node 10 as an example of the first embodiment. FIG. 12 is a flow chart illustrating an example of the operation when the node 10 determines each state of the other nodes 10, and FIG. 13 is a flow chart illustrating an example of the operation when the node 10 determines the state of the node 10.

[1-4-1] Example of Operation after Starting of a New Node

First, an example of the operation after starting of the new node 10 will be described with reference to FIG. 11.

As illustrated in FIG. 11, when the node (new node) 10 starts (step S1) to be connected to the network in the storage system 1, the state of the node 10 is determined to be Alive by the node state determination unit 13 of the new node 10 (step S2).

Then, node information of the node 10, such as an IP address and a port number, is collected by the transmission processing unit 14, and the transmission information T3 (refer to FIG. 6) is generated. Then, the transmission information T3 generated by the transmission processing unit 14 is transmitted to all nodes 10 in the storage system 1 by broadcasting or the like (step S3).

Each of the other nodes 10 that receive the transmission information T3 adds the node information of the new node 10 to the node state management information T2, and transmits a heartbeat (node state information T1) to destinations including the new node 10.

In the new node 10, the reception processing unit 12 waits for the heartbeat (step S4; No route in step S4). When the heartbeat is received from the other nodes 10 (Yes route in step S4), the node information of each of the other nodes 10 is extracted from the received node state information T1' (refer to FIG. 7) by the reception processing unit 12, and the node state management information T2 is generated (step S5).

Then, in the new node 10, the transmission processing unit 14 starts the service to transmit a heartbeat every first predetermined time based on the node state management information T2 (step S6), and the process performed after starting of the new node 10 is ended.

[1-4-2] Example of Operation of Determining States of Other Nodes by a Node

Next, an example of the operation when the node 10 determines the states of the other nodes 10 will be described with reference to FIG. 12.

In addition, the process of steps S11 to S23 illustrated in FIG. 12 is a process performed when the state of one node 10 is determined by the node state determination unit 13 in each node 10. Therefore, the process of steps S11 to S23 is performed periodically (every first predetermined time) for each of the other nodes 10 by the node state determination unit 13 of each node 10.

As illustrated in FIG. 12, the node state determination unit 13 determines which state the last determination state for the node 10 to be determined is with reference to "state" in the node state management information T2 (steps S11, S16, and S19).

When the last determination state for the node 10 to be determined Alive (Yes route in step S11), the node state determination unit 13 determines whether or not the non-arrival time of the heartbeat from the node 10 to be determined exceeds a threshold value (step S12). In this case, the node state determination unit 13 determines whether or not the time of "last update information" of the node state management information T2 is longer than the second predetermined time.

When the heartbeat non-arrival time exceeds a threshold value (Yes route in step S12), the node state determination unit 13 determines the state of the node 10 to be determined to be Suspect (step S13), and the process is ended. In this case, the node state determination unit 13 sets Suspect in "state" in the node state management information T2 for the node 10 to be determined. Then, when there is the next node 10 to be determined, the node state determination unit 13 proceeds to a process of determining the state related to the next node 10 to be determined.

On the other hand, when the node state determination unit 13 determines that the heartbeat non-arrival time does not exceed the threshold value in step S12 (No route in step S12), the process proceeds to step S14. In step S14, the node state determination unit 13 determines whether the state of the node 10 to be determined has been determined to be Suspect by the majority (first predetermined value) of nodes 10 or determined to be Down by any of the plurality of nodes 10.

When the state of the node 10 to be determined is not determined to be Suspect by the majority of nodes 10 and is not determined to be Down by any of the plurality of nodes 10 (No route in step S14), the process on the node 10 to be determined is ended. On the other hand, when the state of the node 10 to be determined is determined to be Suspect by the majority of nodes 10 or is determined to be Down by any of the plurality of nodes 10 (Yes route in step S14), the process proceeds to step S15.

In step S15, the state of the node 10 to be determined is determined to be Down by the node state determination unit 13, and the process is ended. In this case, the node state determination unit 13 sets Down in "state" in the node state management information T2 for the node 10 to be determined.

In addition, when the last determination state for the node 10 to be determined is Suspect (No route in step S11 to Yes route in step S16), the process proceeds to step S17. In step S17, the node state determination unit 13 determines whether or not a new heartbeat has been received from the node 10 to be determined, that is, whether or not the heartbeat non-arrival time is less than the threshold value. In this case, the node state determination unit 13 determines whether or not the time of "last update information" of the node state management information T2 is less than the second predetermined time.

When a new heartbeat has not been received (No route in step S17), the process proceeds to step S14. On the other hand, when a new heartbeat is received (Yes route in step S17), the node state determination unit 13 determines the state of the node 10 to be determined to be Alive (step S18), and the process is ended. In this case, the node state determination unit 13 sets Alive in "state" in the node state management information T2 for the node 10 to be determined.

When the last determination state for the node 10 to be determined is Down (No route in step S11, from No route in step S16 to Yes route in step S19), the process proceeds to step S20. In step S20, the node state determination unit 13 determines whether or not the state of the node 10 to be determined has been determined to be Down by a second predetermined number of nodes 10 (for example, all nodes 10).

When the state of the node 10 to be determined is not determined to be Down by all nodes 10 (No route in step S20), the process on the node 10 to be determined is ended. On the other hand, when the state of the node 10 to be determined is determined to be Down by all nodes 10 (Yes route in step S20), the state of the node 10 to be determined is determined to be Zombie by the node state determination unit 13. In addition, when data held in the node 10 is associated with data held in the node 10 to be determined, recovery processing on the node 10 to be determined is performed by the recovery processing unit 15 (step S21), and the process is ended. In this case, the node state determination unit 13 sets Zombie in "state" in the node state management information T2 for the node 10 to be determined.

When the last determination state for the node 10 to be determined is Zombie (No route in step S11, No route in step S16, and No route in step S19), the process proceeds to step S22. In step S22, the node state determination unit 13 determines whether or not the recovery processing on the node 10 to be determined has been completed. When the recovery processing is not completed, the process on the node 10 to be determined is ended. On the other hand, when the recovery processing has been completed (Yes route in step S22), the node state determination unit 13 deletes information regarding the node 10 to be determined from the node state management information T2 (step S23), and the process is ended.

As described above, the process of determining the state of one node 10 is performed by the node 10.

[1-4-3] Example of Operation of Determining a State of the Node by a Node

Next, an example of the operation when the node 10 determines the state of the node 10 will be described with reference to FIG. 13.

In addition, the process of steps S31 to S34 illustrated in FIG. 13 is a process performed when the state of the node 10 is determined by the node state determination unit 13 in each node 10. Therefore, the process of steps S31 to S34 is performed periodically (every first predetermined time) by the node state determination unit 13 of each node 10.

As illustrated in FIG. 13, the node state determination unit 13 determines whether or not the occurrence of a predetermined failure in the node 10, for example, the occurrence of an unrecoverable failure has been detected (step S31).

When the occurrence of a predetermined failure is detected (Yes route in step S31), the node state determination unit 13 determines the state of the node 10 to be Down (step S32), and the process is ended. In this case, the node state determination unit 13 sets Down in "state" in the node state management information T2 for the node 10.

On the other hand, when the occurrence of a predetermined failure is not detected (No route in step S31), the node state determination unit 13 determines whether or not the number of nodes, in which the heartbeat non-arrival time exceeds a threshold value, reaches a majority (step S33). In this case, the node state determination unit 13 determines whether or not the number of other nodes 10, for which the time of "last update information" of the node state management information T2 is longer than the second predetermined time, is equal to or greater than the third predetermined value.

When the number of nodes in which the heartbeat non-arrival time exceeds a threshold value is a majority (Yes route in step S33), the node state determination unit 13 determines the state of the node 10 to be Isolate (step S34), and the process is ended. In this case, the node state determination unit 13 sets Isolate in "state" in the node state management information T2 for the node 10.

On the other hand, when the node state determination unit 13 determines that the number of nodes in which the heartbeat non-arrival time exceeds a threshold value is less than the majority in step S33 (No route in step S33), the determination process related to the state of the node 10 is ended. Then, when there is the next node 10 to be determined, the node state determination unit 13 proceeds to a process of determining the state related to the next node 10 to be determined.

In addition, in step S32 or S34, when the state of the node 10 is determined to be Down or Isolate by the node state determination unit 13, the node 10 receives recovery processing from the recovery processing unit 15 of the other nodes 10. Then, stop processing on the node 10 is performed by the stop processing unit 16 or the recovery processing unit 15 of the other nodes 10.

As described above, the process of determining the state of the node 10 is performed by the node 10.

[1-5] Summary of the First Embodiment

Thus, according to the storage system 1 as an example of the first embodiment, the reception processing unit 12 in each of the plurality of nodes 10 receives the node state information T1 from each of the other nodes 10. In addition, the node state determination unit 13 determines each state of the plurality of nodes 10 based on the node state information T1 received from each of the other nodes 10 by the reception processing unit 12. Further, the transmission processing unit 14 transmits to each of the other nodes 10 the node state information for transmission T1 based on the determination result of the node state determination unit 13.

Therefore, each node 10 can monitor the node 10 and the other nodes 10 based on the states of the plurality of nodes 10 determined by the other nodes 10 instead of monitoring the state of the node 10 centrally by a specific node, a monitoring device, or the like. As a result, it is possible to avoid a situation where the use of the storage system 1 is limited due to the failure of a specific node, a monitoring device, or the like. In addition, since each node 10 monitors the node 10 and the other nodes 10 autonomously, determination of a node for monitoring may be omitted, and the intervention of an administrator or the like may be omitted. Therefore, it is possible to reduce the time for which the use of the storage system 1 is limited after the failure of the node 10.

Thus, according to the storage system 1 as an example of the first embodiment, in the storage system 1 including the plurality of nodes 10, it is possible to suppress a reduction in the availability due to monitoring of each state of the plurality of nodes 10.

In addition, the node state determination unit 13 determines each state of the plurality of nodes 10 based on each state of the plurality of nodes 10, which is indicated by the node state information T1 received by the reception processing unit 12, and the reception status of the node state information T1 from each of the other nodes 10. In addition, the transmission processing unit 14 transmits the node state information for transmission T1 to each of the other nodes 10 every first predetermined time.

Therefore, since each node 10 can determine each state of the plurality of nodes 10 according to the reception status of the node state information T1 from each of the other nodes 10 every first predetermined time, it is possible to easily detect the abnormalities of the node 10 that is difficult to transmit the node state information T1.

Further, the node state determination unit 13 determines each state of the other nodes 10, from which the node state information T1 has not been received within the second predetermined time, to be Suspect. In addition, the node state determination unit 13 determines the state of the node 10, which is determined to be in the state of Suspect by a first predetermined number of nodes 10 or more, or the state of the node 10, which is determined to be in the state of Down by at least one of the other nodes 10, to be Down.

Accordingly, each node 10 can determine the node 10, in which a failure or the like has occurred, in consideration of the determination results of the other nodes 10 without the node 10 determining immediately that the node 10, from which the node state information T1 has not been transmitted, is the node 10 in which a failure or the like has occurred. As a result, the node 10 can obtain a highly reliable determination result for the state of each node 10.

In addition, the node state determination unit 13 determines the node 10, which is determined to be in the state of Down by the plurality of nodes 10 of the second predetermined number or more, to be Zombie. In addition, the recovery processing unit 15 performs recovery processing on the node 10 determined to be Zombie by the node state determination unit 13.

In this case, since the recovery processing unit 15 performs recovery processing on the node 10 determined to be Down by a second predetermined number of nodes 10 or more, for example, all nodes 10, it is possible to suppress the execution of recovery processing due to erroneous determination. In addition, since the state of the node 10 in which a failure or the like has occurred changes to a Zombie state indicating "under recovery processing", it is possible to suppress the access of the client or the node 10, on which recovery processing is not performed, to the node 10 in the Zombie state that holds old data.

Further, when a predetermined failure occurs in the node 10, the node state determination unit 13 determines the state of the node 10 to be Down. In addition, when the node state information T1 is not received from a third predetermined number of other nodes 10 or more within the second predetermined time, the node state determination unit 13 determines the state of the node 10 to be Isolate. Further, when the node state determination unit 13 determines the state of the node 10 to be Down or Isolate, the stop processing unit 16 stops the node 10.

In this manner, it is possible to suppress the access of the client or the node 10, on which recovery processing is not performed, to old data held in the node 10. In addition, since the node 10 that has become in the state of Isolate is stopped autonomously, it is possible to suppress the occurrence of inconsistency of redundant data even if the node 10 falls into the split brain state.

[2] Second Embodiment

[2-1] Explanation on a Node

Next, a node 10A as an example of a second embodiment will be described.

The storage system 1 according to the first and second embodiments may include a large number of nodes (for example, tens to thousands of nodes).

As described above, the storage system 1 according to the first embodiment performs communication of a heartbeat in a full mesh state of all nodes 10 to all nodes 10.

On the other hand, the storage system 1 according to the second embodiment divides the nodes 10A into a number of (for example, about several to several tens of) groups (hereinafter, referred to as parties), and communication of a heartbeat in the full mesh state is performed between the nodes 10A in a party. On the other hand, between parties, communication of a heartbeat in the full mesh state is performed by the representative nodes 10A of the parties.

Thus, in the storage system 1 as an example of the second embodiment, the exchange of information in the hierarchical nodes 10A is performed by the plurality of nodes 10A. In this case, it is possible to reduce the communication load and the processing load in the storage system 1, compared with a case where the communication of a heartbeat in the full mesh state by all nodes 10A is performed in the storage system 1. In particular, this is effective for a case where the storage system 1 includes a large number of nodes 10A (for example, thousands of nodes 10A).

[2-2] Configuration of a Node

Next, the configuration of the node 10A as an example of the second embodiment will be described with reference to FIGS. 14 to 23.

Figure 14:
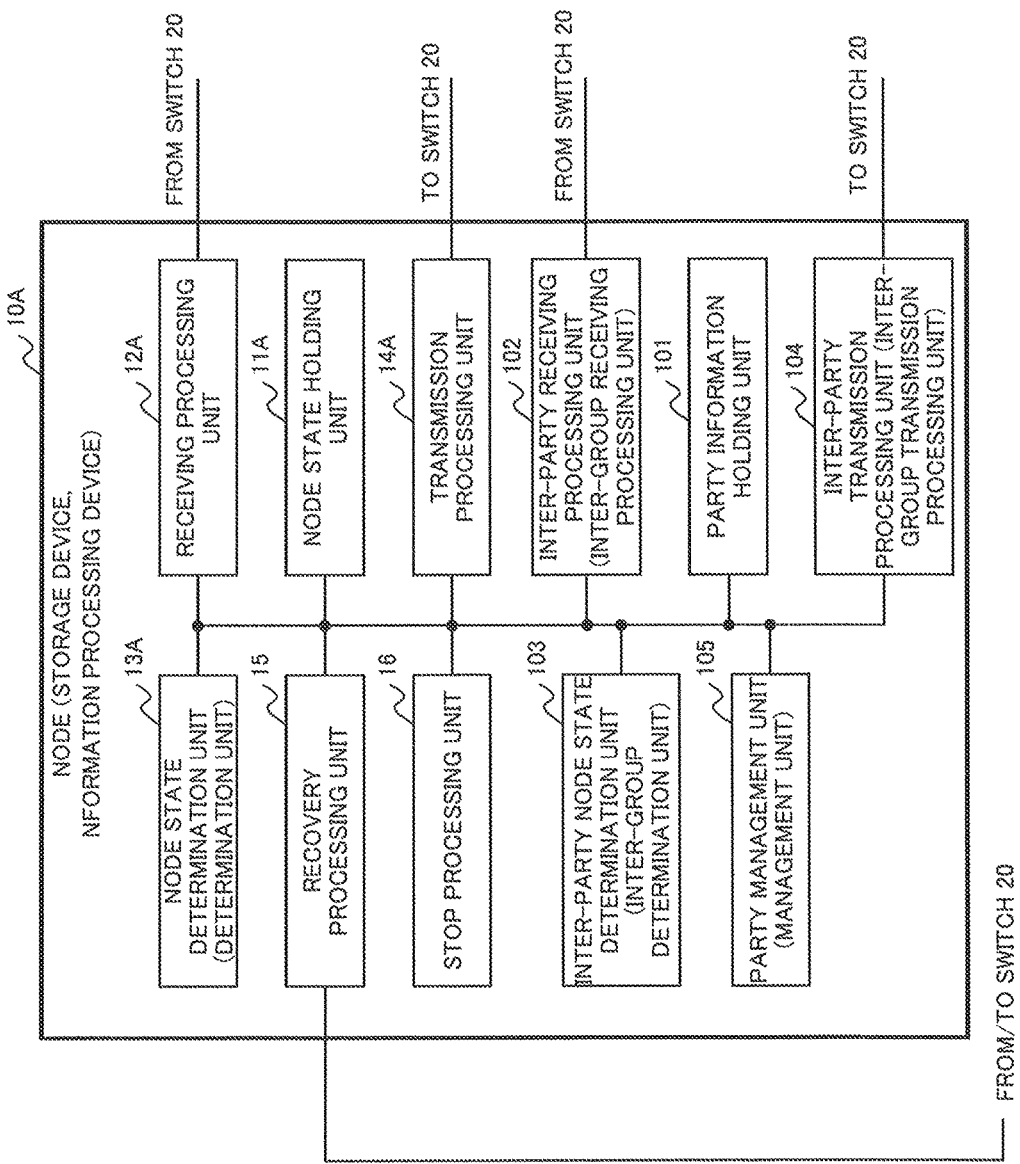
FIG. 14 is a diagram illustrating an example of the functional configuration of a node as an example of a second embodiment.

FIG. 14 is a diagram illustrating an example of the functional configuration of the node 10A as an example of the second embodiment.

The node 10A according to the second embodiment further includes a party information holding unit 101, an inter-party reception processing unit 102, an inter-party node state determination unit 103, an inter-party transmission processing unit 104, and a party management unit 105 compared with the node 10 according to the first embodiment.

In addition, the node 10A according to the second embodiment includes a node state holding unit 11A and a reception processing unit 12A having some different functions from the node state holding unit 11 and the reception processing unit 12 included in the node 10 according to the first embodiment.

Further, the node 10A according to the second embodiment includes a node state determination unit 13A and a transmission processing unit 14A having some different functions from the node state determination unit 13 and the transmission processing unit 14 included in the node 10 according to the first embodiment.

In addition, for points other than those described above, the node 10A has the same configuration as the node 10 unless otherwise stated in the following explanation. Therefore, in the following explanation of the node 10A, repeated explanation of components having the same reference numerals as the components of the node 10 will be omitted.

[2-2-1] Party Information Holding Unit and Node State Holding Unit

The party information holding unit 101 is a storage region for holding party management information T4 illustrated in FIG. 15, and is realized by the memory 10b described above, for example.

FIG. 15 is a diagram illustrating party management information managed by the node 10A as an example of the second embodiment.

As described above, the storage system 1 as an example of the second embodiment divides the plurality of nodes 10A into a plurality of parties (about several to several tens of parties).

The party management information T4 is information for managing a plurality of parties and the nodes 10A belonging to the parties so as to match each other. In addition, the node 10A can generate the party management information T4 as a table as illustrated in FIG. 15 and transmit and receive the table.

As illustrated in FIG. 15, the party management information T4 includes a party ID that is an example of identification information of a party, a node ID that is an example of identification information of the node 10A belonging to a party, and a version number of a party. The party management information T4 illustrated in FIG. 15 includes information regarding party IDs "A" to "E".

As an example, node IDs "1 to 10" and a version number "1" are matched to the party ID "A".

In addition, although the party ID has been mentioned as an example of the identification information of a party, the identification information of a party is not limited thereto. It is preferable that the identification information be unique information by which each party can be specified. For example, not only the alphabet but also numeric values, a minimum value or maximum value of the range of the node ID, and a mask of the IP address, may be used as identification information.

In addition, although the node ID has been mentioned as an example of the identification information of the node 10, the identification information is not limited thereto, and any unique information that can specify the node 10A as previously described in the first embodiment.

In addition, in the party management information T4 illustrated in FIG. 15, the range (minimum value to maximum value) of the node ID of the node 10A belonging to a party is set in the node ID. However, those set in the node ID are not limited thereto. For example, in the node ID, a plurality of ranges or one node ID may be set as the node ID of the node 10A belonging to a party.

A version number is used when the node 10A determines whether or not the party management information T4 held in the node 10A is the latest information. For example, parties may be divided or integrated by the party management unit 105 to be described later. In this case, since node IDs belonging to the parties that are divided or integrated are also changed, each node 10A identifies the latest party management information T4 with reference to the version number.

The node state holding unit 11A is a storage region for holding node state management information T7 illustrated in FIG. 19, and is realized by the memory 10b described above, for example.

[2-2-2] Inter-Party Reception Processing Unit and Reception Processing Unit

Next, the inter-party reception processing unit 102 and the reception processing unit 12 will be described with reference to FIGS. 16 to 19.

Figure 16:
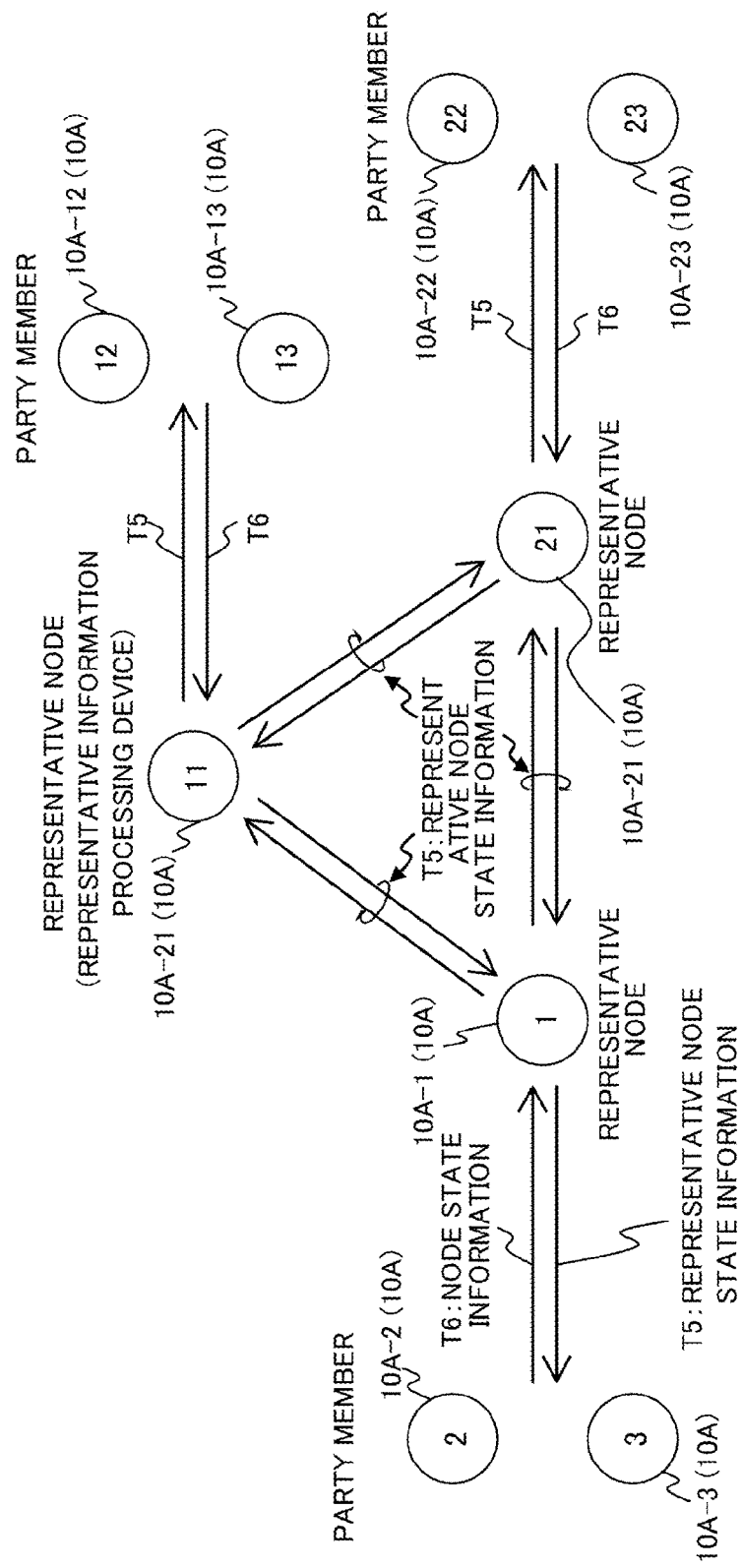
FIG. 16 is a diagram illustrating an example of the process of transmitting and receiving representative node state information and node state information by a plurality of nodes as an example of the second embodiment.
Figure 18:
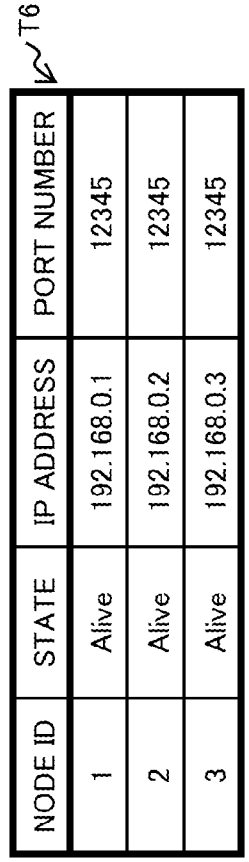
FIG. 18 is a diagram illustrating representative node state information that a node as an example of the second embodiment transmits and receives.

FIG. 16 is a diagram illustrating an example of the process of transmitting and receiving representative node state information T5 and node state information T6 by the plurality of nodes 10A as an example of the second embodiment. FIG. 17 is a diagram illustrating the representative node state information T5 transmitted and received by the node 10A, and FIG. 18 is a diagram illustrating the node state information T6 transmitted and received by the node 10A. FIG. 19 is a diagram illustrating the node state management information T7 managed by the node 10A.

In addition, in the example illustrated in FIG. 16, only a connection state between the nodes 10A is illustrated and the switch 20 is not illustrated for simplicity of explanation.

As illustrated in FIG. 16, the representative node (a representative storage device, a representative information processing device) 10A transmits and receives the representative node state information T5 to and from the other representative nodes 10A in parties (second groups) other than the party (first group) to which the representative node 10A belongs. In addition, the representative node 10A transmits the representative node state information T5 to the member node 10A that is a party member of the party, and the member node 10A transmits the node state information T6 to the representative node 10A of the party.

In addition, in the example illustrated in FIG. 16, the number surrounded by a circle indicates a node ID. Hereinafter, when specifying the representative node 10A of the node ID "1", for example, an expression of a representative node 10A-1 or a node 10A-1 is used. In addition, when specifying the member node 10A of the node ID "2", for example, an expression of a member node 10A-2 or a node 10A-2 is used.

Since the representative node 10A and the member node 10A can have the same function unless otherwise stated, a function of the arbitrary node 10A will be described below.

When the node 10A is the representative node 10A of a party, the inter-party reception processing unit (inter-group reception processing unit) 102 receives the representative node state information T5 illustrated in FIG. 17 from each representative node 10A of other parties. Then, the inter-party reception processing unit 102 of the representative node 10A updates the node state management information T7 (refer to FIG. 19), which is held in the node state holding unit 11A, based on the received representative node state information T5.

The reception processing unit 12A receives the representative node state information T5 or the node state information T6 illustrated in FIG. 18 from each of the nodes 10A (including the representative node 10A in the party) other than the node 10A in the party to which the node 10A belongs. Then, the reception processing unit 12A updates the node state management information T7 (refer to FIG. 19) held in the node state holding unit 11A.

The representative node state information (representative state information) T5 is information regarding each state of the representative nodes 10A of a plurality of parties determined by the representative node 10A of the transmission source. For example, a state of the member node 10A in the party determined by the representative node 10A and states of all nodes 10A belonging to the other parties acquired from the representative nodes 10A of the other parties are included in the representative node state information T5 transmitted from the representative node 10A. In addition, the representative node 10A can generate the representative node state information T5 as a table as illustrated in FIG. 17 and transmit and receive the table.

For example, in the example illustrated in FIG. 17, the representative node 10A-1 illustrated in FIG. 16 makes the states of the nodes 10A-1 to 10A-3 in the party determined within the party be included in the representative node state information T5 transmitted to other representative node 10A-11 and 10A-21. In addition, the representative node 10A-1 makes the states of nodes 10A-11 to 10A-13 and 10A-21 to 10A-23 in the other parties received from the other representative node 10A-11 and 10A-21 be included in the representative node state information T5.

In addition, the representative node 10A also transmits the same representative node state information T5 as that transmitted to the other representative nodes 10A to the member nodes 10A-2 and 10A-3 in the party, and receives the node state information T6 from the member nodes 10A-2 and 10A-3.

That is, the representative node 10A and the member node 10A in a party send notification of a determination result of the state of the node 10A to each other through a heartbeat, and the representative node 10A transmits a determination result within the party to the representative nodes 10A of all parties.

In addition, since the data structure of the representative node state information T5 is basically the same as the node state information T1 illustrated in FIG. 4, detailed explanation thereof will be omitted.

The node state information (state information) T6 is information including each state of the other nodes (member nodes) 10A in the party determined by the node 10A of the transmission source. For example, in the example illustrated in FIG. 18, the member node 10A-2 illustrated in FIG. 16 makes the states of the nodes 10A-1 to 10A-3 determined within the party be included in the node state information T6 transmitted to the nodes 10A-1 and 10A-3 belonging to the party. In addition, the node 10A can generate the node state information T6 as a table as illustrated in FIG. 18 and transmit and receive the table.

In addition, since the data structure of the node state information T6 is basically the same as the node state information T1 illustrated in FIG. 4, detailed explanation thereof will be omitted.

Hereinafter, the representative node state information T5 and the node state information T6 may be simply referred to as the node state information T5 and T6.

The node state management information T7 is information to manage each state of the plurality of nodes 10A determined by the node 10A and all nodes 10A of all parties. In addition, the node 10A can generate the node state management information T7 as a table as illustrated in FIG. 19 and manage the table.

In the following explanation of FIG. 19, the node 10A is assumed to be the representative node 10A-1.

As illustrated in FIG. 19, the node state management information T7 includes a node ID of the node 10A, a state of each node 10A, an IP address as the address of the node 10A, and a port number of the node 10A, similar to the node state management information T2 illustrated in FIG. 5. In addition, the node state management information T7 further includes a state of each node 10A included in the node state information T5 or T6 received from the other nodes 10A and last update information of each of the other nodes 10A. For example, "by 2", "by 3", "by 11" to "by 13", and "by 21" to "by 23" are included in the state of each node 10A included in the node state information T5 or T6 received from the other nodes 10A.

The node state management information T7 illustrated in FIG. 19 includes states of the node IDs "1" to "3", "11" to "13", and "21" to "23" corresponding to the nodes 10A-1 to 10A-3, 10A-11 to 10A-13, and 10A-21 to 10A-23.

As an example, a state "Alive" determined by the node 10A, a state "Alive" determined by each of the other nodes 10A-2, 10A-3, 10A-11, and 10A-21, and last update information "1 sec ago" are matched with the node ID "1". In addition, an IP address "192.168.0.1" and a port number "12345" are further matched with the node ID "1".

The inter-party reception processing unit 102 updates the node state management information T7 when the representative node state information T5 is received from each of the other representative nodes 10A. In addition, the reception processing unit 12A updates the node state management information T7 when the node state information T5 or T6 is received from each of the other nodes 10A in the party. Specifically, the inter-party reception processing unit 102 and the reception processing unit 12A set the state of each node 10A, which is included in the received node state information T5 or T6, in columns of the corresponding other nodes 10A in the node state management information T7. That is, the states determined by the other nodes 10A illustrated in FIG. 19 are set based on the information from the corresponding other nodes 10A.

In addition, update of the node state management information T7 by the inter-party reception processing unit 102 and the reception processing unit 12A is the same as the process by the reception processing unit 12 according to the first embodiment. Accordingly, repeated explanation thereof will be omitted.

Similar to the reception processing unit 12, the inter-party reception processing unit 102 and the reception processing unit 12A update the node state management information T7 whenever the node state information T5 or T6 is received or every first predetermined time.

In addition, the reception processing unit 12A can receive the IP address and the port number of the node 10A newly added, as described above with reference to FIGS. 6 and 7, in addition to the above-described reception of the node state information T5 or T6.

In addition, the inter-party reception processing unit 102 can receive the party management information T4 illustrated in FIG. 15 in addition to the above-described reception of the representative node state information T5.

When the party management information T4 is received from the representative node 10A, the inter-party reception processing unit 102 compares the party management information T4 with the party management information T4 held in the node state holding unit 11A. Then, when a newly added party ID or a party ID having an updated version number is present in the received party management information T4, the inter-party reception processing unit 102 updates the party management information T4 held in the node 10A using the information of the party ID.

Incidentally, the representative node 10A of each party is determined based on a predetermined rule. For example, the representative node 10A is determined based on the party management information T4, the node state management information T7, and the like held in each node 10A.

As an example, the node 10A having a smallest node ID among the nodes 10A belonging to a party can be set as the representative node 10A. Thus, each node 10A can select the representative node 10A easily by defining a predetermined rule, by which determination can be made from the information held in each node 10A, in advance.

Therefore, even if a failure or the like occurs in the representative node 10A, the node 10A in the party can select the next representative node 10A based on the predetermined rule. In addition, even if the representative nodes 10A of the other parties are stopped, the representative node 10A can estimate the new representative nodes 10A of the other parties. Accordingly, inter-party heartbeat communication can be continued between the representative node 10A and the new representative nodes 10A.

[2-2-3] Inter-Party Node State Determination Unit and Node State Determination Unit The inter-party node state determination unit (inter-group determination unit) 103 determines each state of the plurality of representative nodes 10A based on the representative node state information T5 received from each of the other representative nodes 10A by the inter-party reception processing unit 102.

In addition, the method used when the inter-party node state determination unit 103 determines the state of each node 10A between the representative nodes 10A is the same as the method used when the node state determination unit 13 according to the first embodiment determines the state of each node 10 between the nodes 10.

For example, the inter-party node state determination unit 103 determines the state of each representative node 10A based on each state of the plurality of representative nodes 10A indicated by the received representative node state information T5 and the reception status of the representative node state information T5 from each of the other representative nodes 10A.

In addition, when the state of each representative node 10A of other parties is determined to be Down by all representative nodes 10A, the representative node 10A determines the node 10A, which is to become the next representative node 10A in the other parties, from the party management information T4 and the node state management information T7. This determination is performed based on a predetermined rule for selecting the representative node 10A as described above.

In addition, the representative node 10A transmits a heartbeat to the nodes 10A of other parties determined to be the next representative nodes 10A. When a heartbeat is received from the nodes 10A of the other parties, the representative node 10A determines the nodes 10A of the other parties to be the new representative nodes 10A. On the other hand, when the non-arrival time of a heartbeat from the nodes 10A of the other parties exceeds a threshold value, the node 10A that is to become the further next representative node 10A is determined.

When no heartbeat is received from all nodes 10A in other parties, the inter-party node state determination unit 103 determines that all nodes 10A belonging to the other parties have been stopped. In this case, the inter-party node state determination unit 103 determines the states of all nodes 10A belonging to the other parties to be Zombie, and makes the recovery processing unit 15 perform recovery processing.

The node state determination unit (determination unit) 13A determines the state of each node 10 in the party based on the node state information T5 or T6 received from each of the other nodes 10A in the party by the reception processing unit 12A.

In addition, the method used when the node state determination unit 13A determines the state of each node 10A between the nodes 10A in the party is the same as the method used when the node state determination unit 13 according to the first embodiment determines the state of each node 10 between the nodes 10.

For example, the node state determination unit 13A determines the state of each representative node 10A in the party based on each state of the plurality of representative nodes 10A indicated by the received node state information T5 or T6 and the reception status of the node state information T5 or T6 from each of the other representative nodes 10A.

In addition, when the state of the representative node 10A of the party is determined to be Down, the node state determination unit 13A applies the above-described predetermined rule for selecting the representative node 10A from the nodes 10A that are alive in the party (in the Alive state).

Then, each node 10A determines whether or not to promote the node 10A to the representative node 10A. When it is determined that the node 10 is promoted, each node 10A as the representative node 10A starts the communication of a heartbeat with the representative nodes 10A of other parties.

Here, the reference location and the update location of the node state management information T7 by the inter-party node state determination unit 103 and the node state determination unit 13A will be described. In addition, in this explanation, it is assumed that the inter-party node state determination unit 103 and the node state determination unit 13A are included in the node 10A-1.

As illustrated in FIG. 19, a region surrounded by the double line in the column of "state" in the node state management information T7 is a state determined in parties (second groups) other than the party (first group) to which the node 10A itself belongs. Therefore, the inter-party node state determination unit 103 and the node state determination unit 13A included in the nodes 10A-1 to 10A-3 do not perform determination and updating basically for the region surrounded by the double line (except for a region surrounded in a square shape by the broken line).

In addition, as illustrated in FIG. 19, a region surrounded in a square shape by the broken line in the column of "state" in the node state management information T7 is a state determined by each representative node 10A of the plurality of parties. Therefore, the inter-party node state determination unit 103 included in the node 10A-1 updates the region, which is surrounded in a square shape by the broken line, based on the determination.

For example, the inter-party node state determination unit 103 performs determination of Alive or Suspect according to whether or not a heartbeat (representative node state information T5) has arrived with reference to the last update information of the other representative nodes 10A. In addition, the inter-party node state determination unit 103 performs determination of Suspect, Down, or Zombie for the other representative nodes 10A by majority determination or the like with reference to a region surrounded in a circular shape by the broken line in the node state management information T7.

Further, as illustrated in FIG. 19, a region surrounded in a square shape by the solid line in the column of "state" in the node state management information T7 is a state determined by each node 10A in the party (first group) to which the each node 10A itself belongs. Therefore, the node state determination unit 13A included in the node 10A-1 updates the region, which is surrounded in a square shape by the solid line, based on the determination.

The node state determination unit 13A performs determination of Alive or Suspect according to whether or not a heartbeat (node state information T5 or T6) has arrived with reference to the last update information of the other nodes 10A. In addition, the node state determination unit 13A performs determination of Suspect, Down, or Zombie for the other nodes 10A by majority determination or the like with reference to a region surrounded in a rounded square shape by the solid line in the node state management information T7.

In addition, since the reference of determination by the inter-party node state determination unit 103 and the node state determination unit 13A is the same as that stated in the first embodiment, detailed explanation thereof will be omitted.

In addition, as described above, the inter-party node state determination unit 103 and the node state determination unit 13A update the node state management information T7 when the state of node 10A is determined.

Specifically, the inter-party node state determination unit 103 and the node state determination unit 13A set the state determined for each of the node 10A and the other nodes 10A in the column of "state" in the node state management information T7 illustrated in FIG. 19.

In addition, the above-described determination by the inter-party node state determination unit 103 and the node state determination unit 13A may be performed simultaneously for all nodes 10A to be determined every first predetermined time, or may be performed every first predetermined time at different timing for each node 10A.

[2-2-4] Inter-Party Transmission Processing Unit and Transmission Processing Unit The inter-party transmission processing unit (inter-group transmission processing unit) 104 transmits the representative node state information T5 regarding each state of the plurality of representative nodes 10A, which is determined by the inter-party node state determination unit 103, to each of the other representative nodes 10A every first predetermined time.

Specifically, the inter-party transmission processing unit 104 specifies the representative node 10A of other parties based on a predetermined rule as described above with reference to the party management information T4 and the node state management information T7. In addition, the inter-party transmission processing unit 104 acquires IP addresses and port numbers of the other representative nodes 10A from the node state management information T7, and determines the destination node of the representative node state information T5.

In addition, the inter-party transmission processing unit 104 generates the representative node state information T5 from the information of the node ID, state, IP address, and port number for all nodes 10A with reference to the node state management information T7. In addition, the inter-party transmission processing unit 104 transmits the generated representative node state information T5 to each of the other representative nodes 10A as a heartbeat.

Moreover, in addition to the transmission of the representative node state information T5, the inter-party transmission processing unit 104 notifies all nodes 10A in the storage system 1 of the party management information T4 (refer to FIG. 14) when the party management information T4 is updated by the party management unit 105 to be described later. In addition, this notification may be performed by broadcasting or the like.

In addition, the inter-party transmission processing unit 104 may transmit the party management information T4 as a heartbeat together with the representative node state information T5 without being limited to the timing at which the party management information T4 is updated.

The transmission processing unit 14A transmits the node state information for transmission T6 to each of the other nodes 10A in the party.

Specifically, the transmission processing unit 14A specifies the other nodes 10A in the party with reference to the party management information T4 and the node state management information T7. In addition, the transmission processing unit 14A acquires IP addresses and port numbers of the other nodes 10A in the party from the node state management information T7, and determines the destination node of the node state information T6.

In addition, the transmission processing unit 14A generates the node state information T6 from the information of the node ID, state, IP address, and port number for each node 10A determined by the node 10A with reference to the node state management information T7. In addition, the transmission processing unit 14A transmits the generated node state information T6 to each of the other nodes 10A in the party as a heartbeat.

Moreover, in addition to the transmission of the node state information T6, the transmission processing unit 14A notifies all nodes 10A in the storage system 1 of the transmission information T3 (refer to FIG. 6) by broadcasting or the like after starting of the node 10A as described above.

In addition, the representative node state information T5 received by the inter-party reception processing unit 102 and the representative node state information T5 transmitted from the inter-party transmission processing unit 104 have the same data structure. In addition, the node state information T6 received by the reception processing unit 12A and the node state information T6 transmitted from the transmission processing unit 14A have the same data structure. Hereinafter, for the sake of convenience, the representative node state information T5 transmitted from the inter-party transmission processing unit 104 may be called representative node state information for transmission (representative state information for transmission) T5, and the node state information T6 transmitted from the transmission processing unit 14A may be called node state information for transmission (state information for transmission) T6.

[2-2-5] Party Management Unit

Next, the party management unit 105 will be described with reference to FIGS. 20 to 23.

Figure 20:
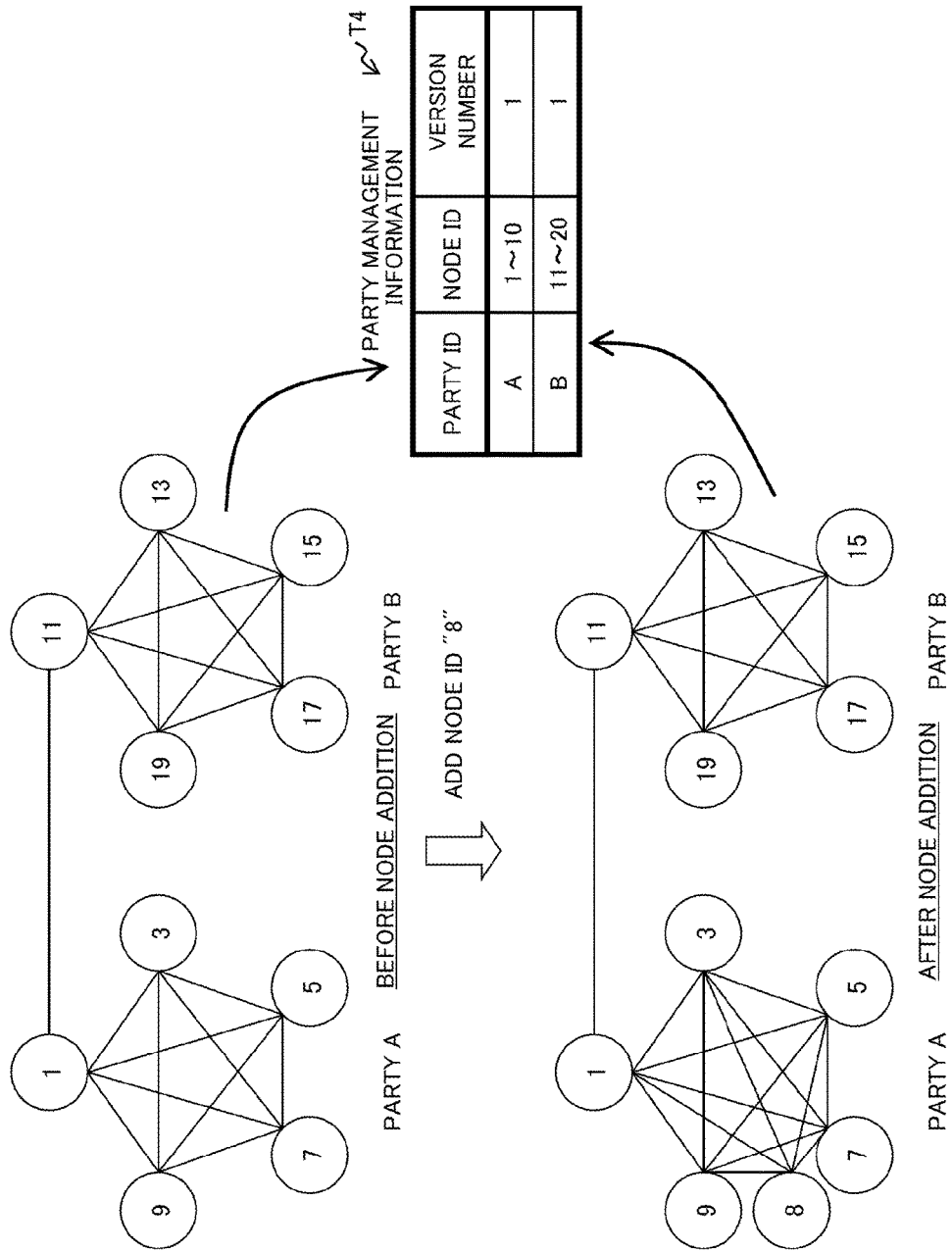
FIG. 20 is a diagram illustrating an example in which a node is added to a storage system as an example of the second embodiment.
Figure 21:
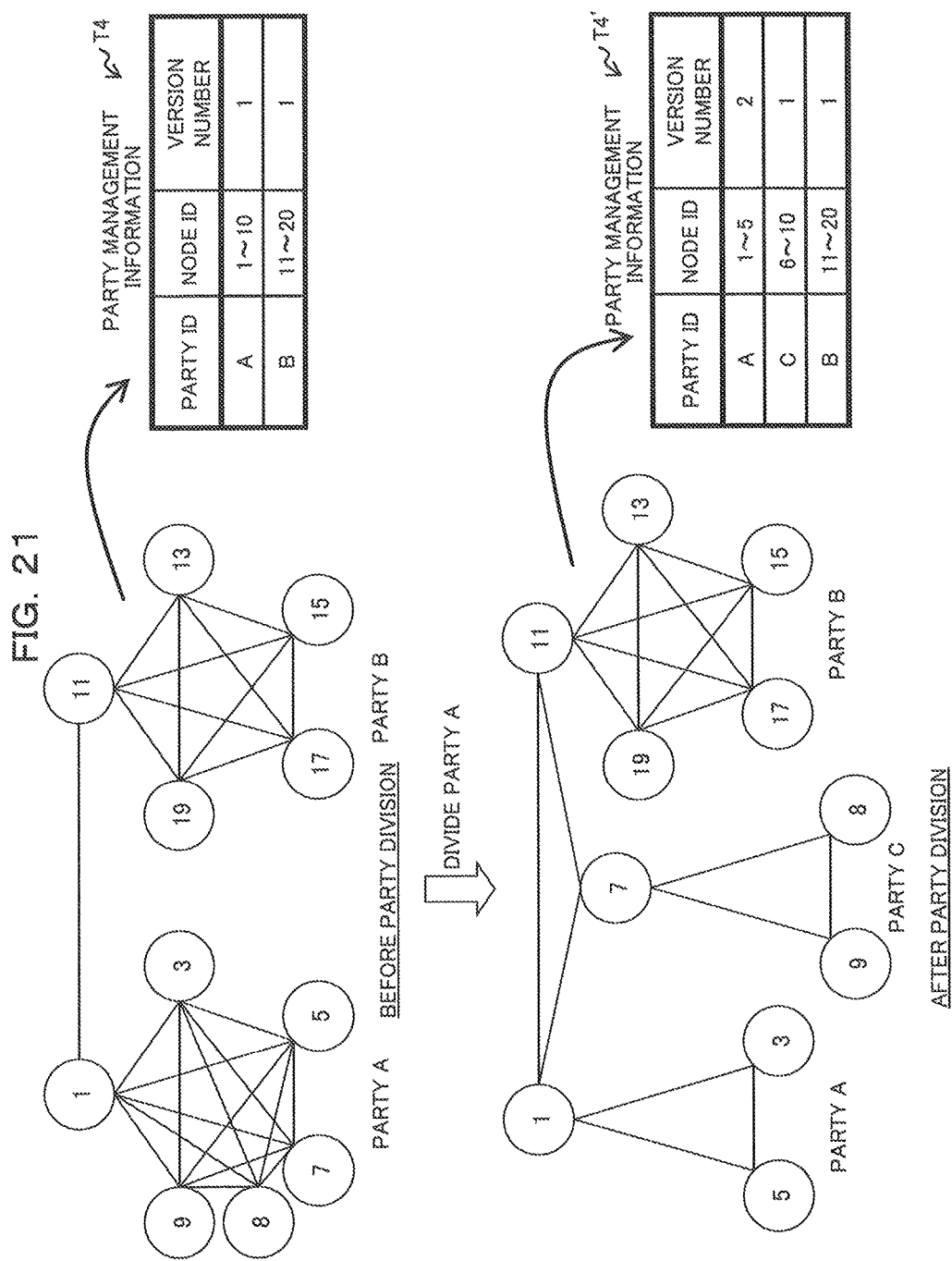
FIG. 21 is a diagram illustrating an example of party division processing in the storage system illustrated in FIG. 20.
Figure 22:
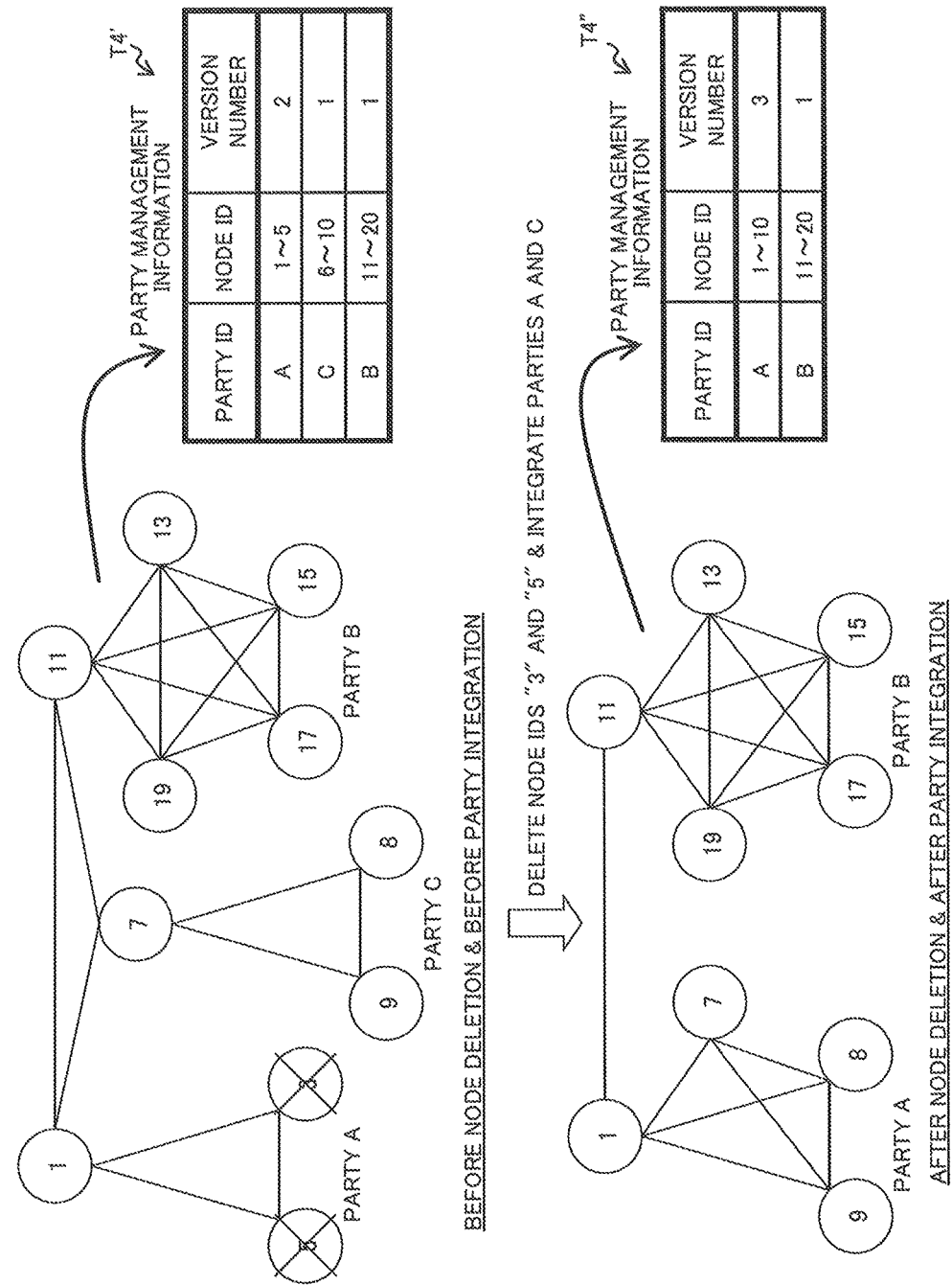
FIG. 22 is a diagram illustrating an example of node deletion processing and party integration processing in the storage system illustrated in FIG. 21.
Figure 23:
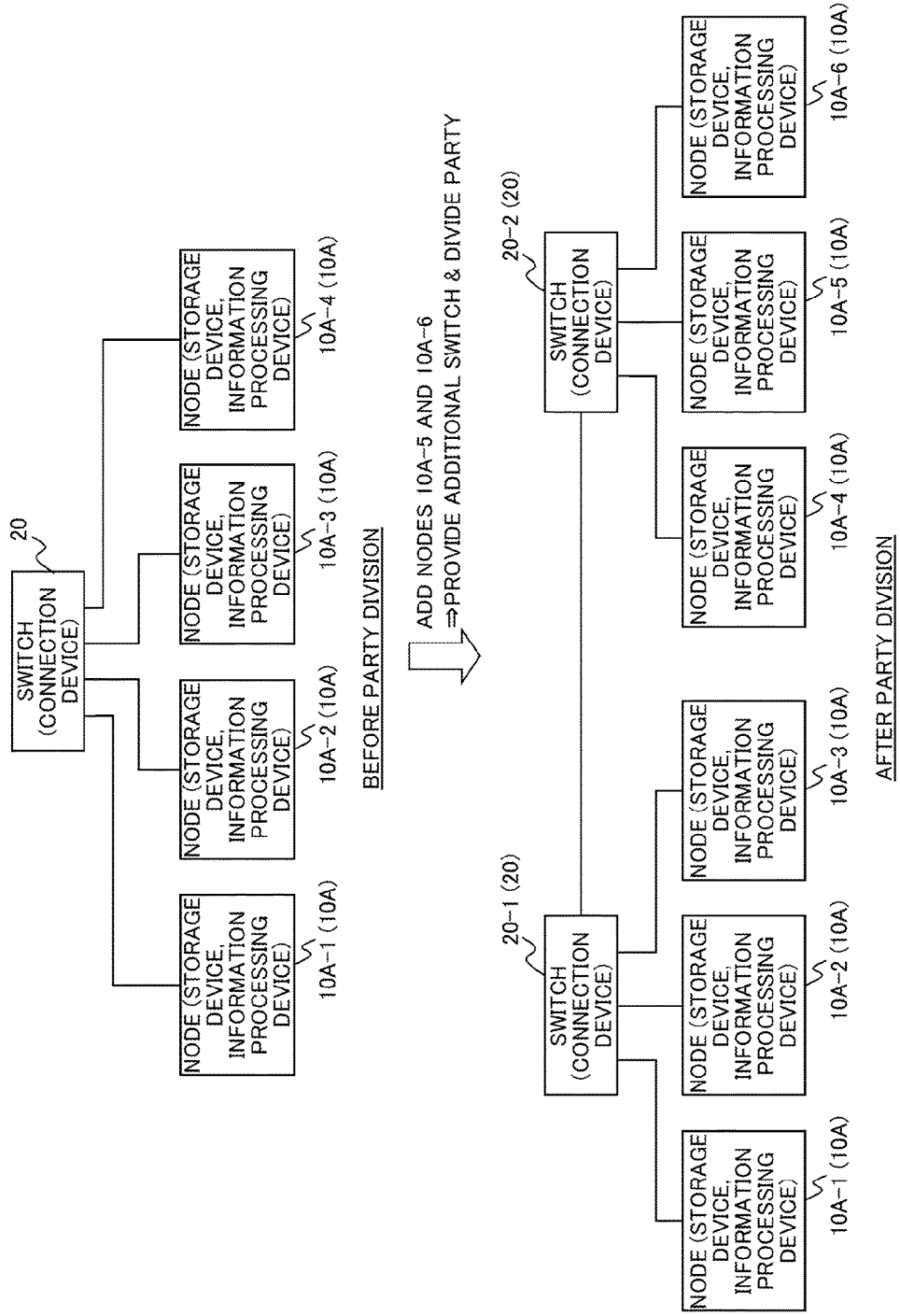
FIG. 23 is a diagram illustrating a specific example of party division processing in the storage system as an example of the second embodiment.

FIG. 20 is a diagram illustrating an example where the node 10A is added to the storage system 1 as an example of the second embodiment, and FIG. 21 is a diagram illustrating an example of party division processing in the storage system 1 illustrated in FIG. 20. FIG. 22 is a diagram illustrating an example of deletion processing of the node 10A and party integration processing in the storage system 1 illustrated in FIG. 21. FIG. 23 is a diagram illustrating a specific example of party division processing in the storage system 1 as an example of the second embodiment.

In addition, in the examples illustrated in FIGS. 20 to 22, only a connection state between the nodes 10A is illustrated and the switch 20 is not illustrated for simplicity of explanation.

The party management unit (management unit) 105 performs management regarding a party to which the node 10A belongs.

Specifically, when the number of nodes 10A belonging to the party exceeds a predetermined upper limit or a predetermined lower limit due to the addition or deletion of the node 10A in the party, the party management unit 105 divides or integrates the party.

For example, when there is one or more parties in the initial state such as when the operation of the storage system 1 is started, the node 10A may be added to the party according to the operation of the storage system 1. When the number of nodes 10A included in the party is increased by the addition of the node 10A, the processing load of the node 10A and the network load may be increased due to the communication of a heartbeat within the party. As a result, the performance of the storage system 1 may be degraded.

Therefore, when the number of nodes 10A in the party exceeds an upper limit (fourth predetermined value) determined in advance, the party management unit 105 separates the plurality of nodes 10A from the party to generate a new party.

In addition, on the contrary, when the number of nodes included in the party is less than a lower limit (fifth predetermined value), the party management unit 105 integrates the party. The reason for the party integration is that the processing load of the representative node 10A and the network load are increased due to the communication of a heartbeat between the representative nodes 10A if there are a number of parties including a small number of nodes 10A. In addition, it is also one of the reasons that the processing load relevant to party management is increased due to a significant increase in the amount of party management information T4.

In addition, although upper and lower limits set in advance differ depending on the size, policy, and the like of the storage system 1, for example, the upper limit can be set to about several tens to several hundreds of units and the lower limit can be set to about several to several tens of units. The following explanation will be given on the assumption that the upper limit is 5 units and the lower limit is 2 units for simplicity of explanation.

A change in the party management information T4 according to the party division or integration of the party management unit 105 can be made for the entry of the party by the representative node 10A belonging to each party. After the party management information T4 is changed, the party management unit 105 included in the representative node 10A transmits the party management information T4 to all nodes 10A through the inter-party transmission processing unit 104 in a state where the party management information T4 is placed on the heartbeat.

In addition, the party management information T4 may be transmitted to all nodes 10A by broadcasting or the like, or may be transmitted to each representative node 10A as a heartbeat together with the representative node state information T5. When the party management information T4 is transmitted to each representative node 10A, it is preferable that the representative node 10A, which has received the party management information T4, transmit the party management information T4 to the member node 10A of the party.

Hereinafter, party division processing and party integration processing of the party management unit 105 will be described.

As illustrated on the upper left side of the plane of FIG. 20, a case where the storage system 1 includes parties A and B will be described as an example. In addition, it is assumed that the party A has five nodes 10A of node IDs "1", "3", "5", "7", and "9" and the party B has five nodes 10A of node IDs "11", "13", "15", "17", and "19". In addition, as illustrated on the right side of the plane of FIG. 20, it is assumed that node IDs "1 to 10" is matched with the party ID "A" and a node ID "11 to 20" is matched with the party ID "B" in the party management information T4.

In addition, the representative nodes 10A of the parties A and B are the nodes 10A of the node IDs "1" and "11" (hereinafter, referred to as representative nodes 10A-1 and 10A-11), respectively.

In the above-described example, a case where the node 10A of the node ID "8" is added to the party A is assumed (refer to the lower left side of the plane of FIG. 20 and the upper left side of the plane of FIG. 21). In this case, six nodes are included in the party A. In addition, since the node ID "8" is within the range of the node ID matched with the party A, there is no change in the party management information T4.

Since the number of nodes 10A belonging to the party A exceeds 5 that is the upper limit, the party management unit 105 included in the representative node 10A-1 divides the party A.

As illustrated on the lower left side of the plane of FIG. 21, the party management unit 105 of the representative node 10A-1 divides the party A so that the number of nodes is reduced to ½ with reference to the party management information T4 and the node state management information T7. For example, the party management unit 105 divides the party A so that the three nodes 10A having small node IDs in order among the node IDs belonging to the party A are left in the party A and the other three nodes are grouped into a party C. That is, the party management unit 105 divides the party A into the new party A including the node IDs "1", "3", and "5" and the new party C including the node IDs "7" to "9".

In addition, if there is a remainder when dividing a party so that the number of nodes is reduced to ½, the party management unit 105 assigns the remaining node 10A to either of two parties after the division.

After the party A is divided, the party management unit 105 of the representative node 10A-1 sets the node IDs to "1" to "5" and changes the version number to "2" in the entry of the party ID "A" of the party management information T4. In addition, the party management unit 105 of the representative node 10A-1 adds the entry of the party ID "C" to the party management information T4 and matches node IDs "6 to 10" and a version number "1" thereto.

Then, the party management unit 105 of the representative node 10A-1 notifies all nodes 10A of changed party management information T4' through the inter-party transmission processing unit 104.

In addition, the node 10A-1 manages the entry of the party ID "A" of the party management information T4 while continuously serving as the representative node 10A in the new party A. On the other hand, in the party C, a predetermined rule for selecting the representative node 10A is applied for the nodes 10A of the node IDs "7" to "9". For example, the node 10A of the node ID "7" (hereinafter, referred to as a representative node 10A-7) becomes the representative node 10A. The representative node 10A-7 manages the entry of the party C while performing heartbeat communication between the representative nodes 10A together with the representative nodes 10A-1 and 10A-11.

As described above, the party division processing is performed by the party management unit 105 included in the representative node 10A.

Then, as illustrated on the upper left side of the plane of FIG. 22, a case is assumed in which the nodes 10A of the node IDs "3" and "5" in the party A have been stopped due to the occurrence of a failure or the like.

Since the number of nodes 10A belonging to the party A is less than 2, which is the lower limit, due to the stop of the nodes 10A, the party management unit 105 included in the representative node 10A-1 integrates the party A with other parties.

As illustrated on the lower left side of the plane of FIG. 22, the party management unit 105 of the representative node 10A-1 determines other parties to be integrated with the party A with reference to the party management information T4' and the node state management information T7. As an example of other parties to be integrated with the party A, a party having a smallest number of nodes can be mentioned. In this case, the party management unit 105 of the representative node 10A-1 determines the party C, which has a smallest number of nodes except for the party A, as a party to be integrated with the party A.

After a party to be integrated with the party A is determined, the party management unit 105 of the representative node 10A-1 sets the node ID in the entry of the party ID "A" of the party management information T4' to "1 to 10" by merging the node ID in the entry of the party ID "A" of the party management information T4' with the node ID of the party C, and changes the version number to "3". In addition, the party management unit 105 of the representative node 10A-7 deletes the entry of the party ID "C" from the party management information T4'.

Then, the party management unit 105 of the representative node 10A-1 notifies all nodes 10A of changed party management information T4" through the inter-party transmission processing unit 104.

In addition, the node 10A-1 manages the entry of the party ID "A" of the party management information T4 while continuously serving as the representative node 10A in the new party A. On the other hand, since the representative node 10A-7 of the party C is a loser of a predetermined rule for selecting the representative node 10A in the new party A, the representative node 10A-7 of the party C is demoted to the member node 10A-7.

In addition, in the example illustrated in FIG. 22, since the parties A and C are integrated, node IDs "1 to 5" and "6 to 10" are merged and accordingly node IDs "1 to 10" are set. However, depending on the state of the party management information T4, a case may also be considered in which the ranges of node IDs of two parties to be integrated are away from each other and a node ID present therebetween may form another party. In such a case, instead of one range, a plurality of ranges or one node ID may also be set as a node ID belonging to a party after integration.

As described above, the party integration processing is performed by the party management unit 105 included in the representative node 10A.

In addition, the party management unit 105 of the representative node 10A can determine whether or not the number of nodes 10A of the party has reached the upper limit and whether or not the number of nodes 10A of the party has become less than the lower limit every predetermined time.

In addition, the party management unit 105 of the representative node 10A may determine whether or not the number of nodes 10A of the party has reached the upper limit when the transmission information T3 transmitted from the new node 10A added to the storage system 1 is received.

Further, the party management unit 105 of the representative node 10A may determine whether or not the number of nodes 10A of the party has become less than the lower limit when a failure or the like occurs in the node 10A in the party and the recovery processing of the node 10A is completed.

The above explanation of the party management unit 105 has been given on the assumption that the party management unit 105 performs the selection of the node 10A according to party division and party integration based on the value of the node ID. However, in the storage system 1, the communication of a heartbeat between the nodes 10A is influenced by latency or packet loss according to the distance between the nodes 10A.

Therefore, it is preferable that the party management unit 105 perform the selection of the node 10A according to party division and party integration, for example, based on the switch 20 to which the node 10A is connected, as will be described below. In addition, it is preferable that the following explanation be similarly considered when an administrator or the like performs initial setting of a party before the start of the operation of the storage system 1 or performs party resetting due to the configuration of the party being complicated during the operation.

As an example, a case is considered in which a group of nodes 10A connected to one switch 20 are set in the same party at the time of initial setting of a party. In an example illustrated on the upper side of the plane of FIG. 23, nodes 10A-1 to 10A-4 are connected to the switch 20, and these nodes 10A-1 to 10A-4 form one party. In addition, the number of ports of the switch 20 is assumed to be 4.

When the number of nodes 10A are not covered by one switch 20 due to the addition of nodes 10A-5 and 10A-6 to the storage system 1, the addition of the switch 20 and the adjustment of the topology are performed by the operator or the like. For example, as illustrated on the lower side of the plane of FIG. 23, the nodes 10A-1 to 10A-3 are connected to a switch 20-1, and the nodes 10A-4 to 10A-6 are connected to a switch 20-2. In addition, the switches 20-1 and 20-2 are connected to each other.

The party management unit 105 of the representative node 10A acquires information regarding the connection relationship of the node 10A and the switch 20 when the nodes 10A-5 and 10A-6 are added (when the node 10A changes to the connection state illustrated on the lower side of the plane of FIG. 23). For example, the party management unit 105 can acquire (estimate) the information regarding the connection relationship of the node 10A and the switch 20 by acquiring the information of the connection point of each port held in the switch 20. In addition, since the acquisition of connection point information or the like from the switch 20 can be performed using various kinds of known methods, explanation thereof will be omitted. In addition, the information regarding the connection relationship of the node 10A and the switch 20 may also be input to the party management unit 105 through the input/output unit 10e by the operator or the like.

Then, from the acquired connection relationship of the node 10A and the switch 20, the party management unit 105 divides the party into a group of nodes 10A connected to the switch 20-1 and a group of nodes 10A connected to the switch 20-2, for example.

Thus, the party management unit 105 can determine the node 10A, which is to be separated from the party, based on information regarding the physical connection relationship of the node 10A and the switch 20 in the party.

In addition, as the information regarding the connection relationship of the node 10A and the switch 20, the party management unit 105 may detect the number of hops from the representative node 10A to each of the other nodes 10A in a party. This is because it can be estimated that a possibility that the nodes 10A having similar numbers of hops will be connected to the same switch 20 is high.

Although the party division processing of the party management unit 105 has been described with reference to FIG. 23 so far, this is the same for the party integration processing of the party management unit 105.

That is, the party management unit 105 may select other parties to be integrated with the party based on the connection relationship of the node 10A and the switch 20 instead of selecting a party having a small number of nodes.

[2-3] Example of Operation

Figure 24:
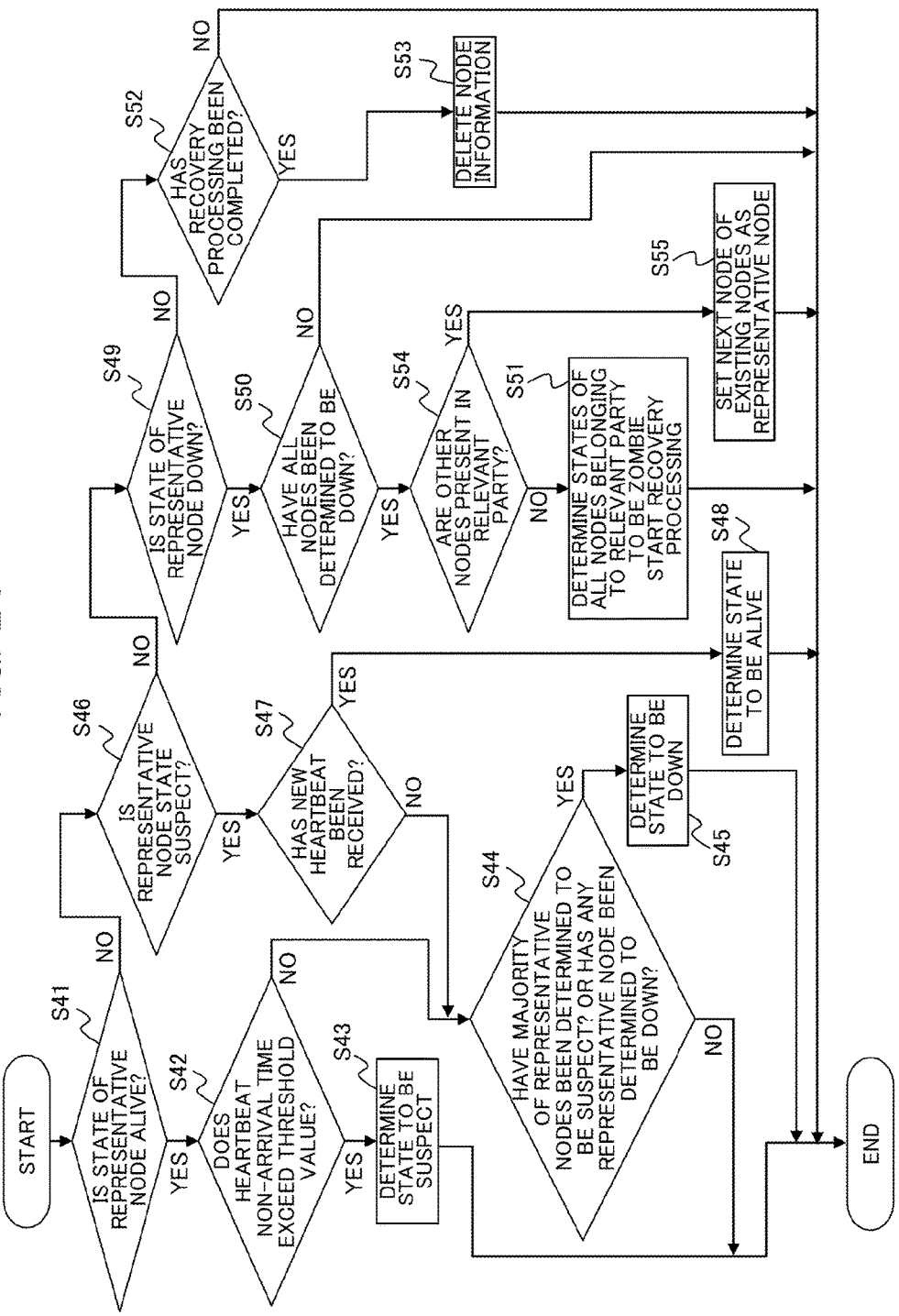
FIG. 24 is a flow chart illustrating an example of the operation when a representative node as an example of the second embodiment determines each state of other representative nodes.
Figure 25:
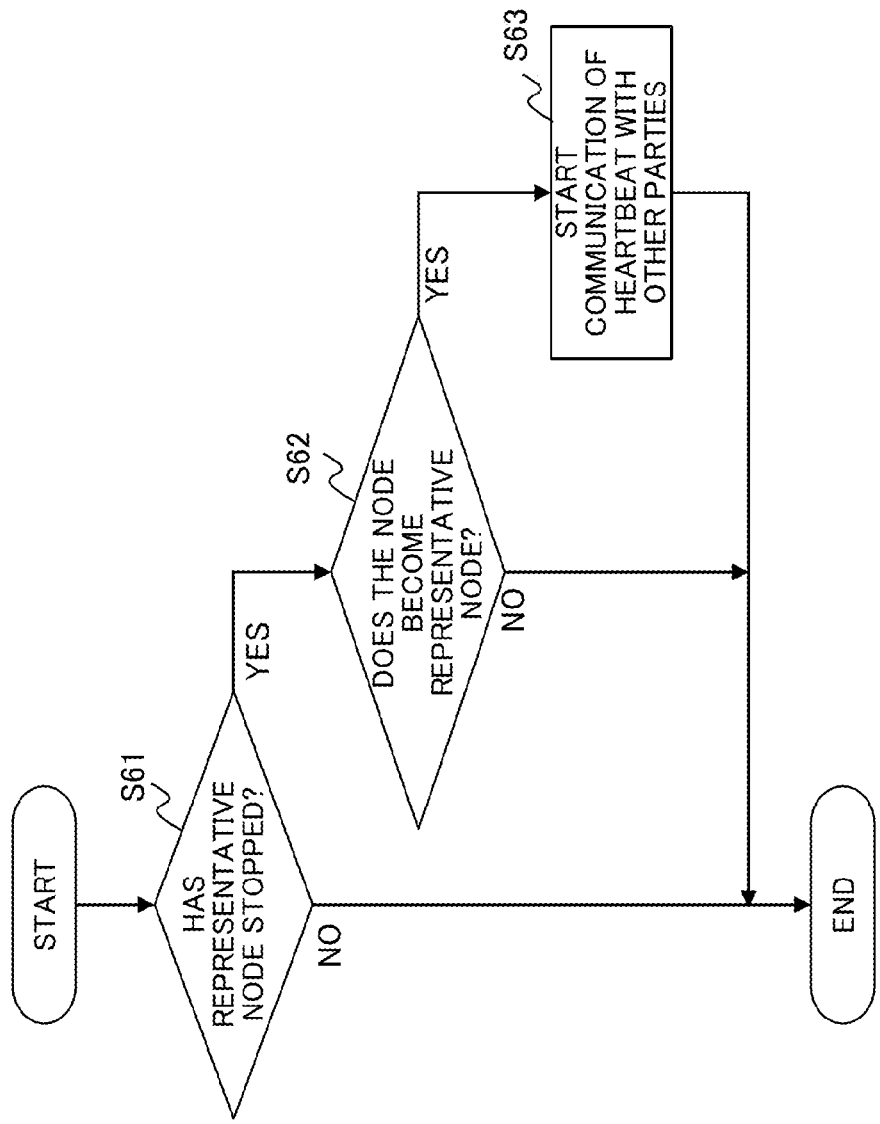
FIG. 25 is a flow chart illustrating an example of the operation when other nodes in a party are stopped by a node as an example of the second embodiment.
Figure 26:
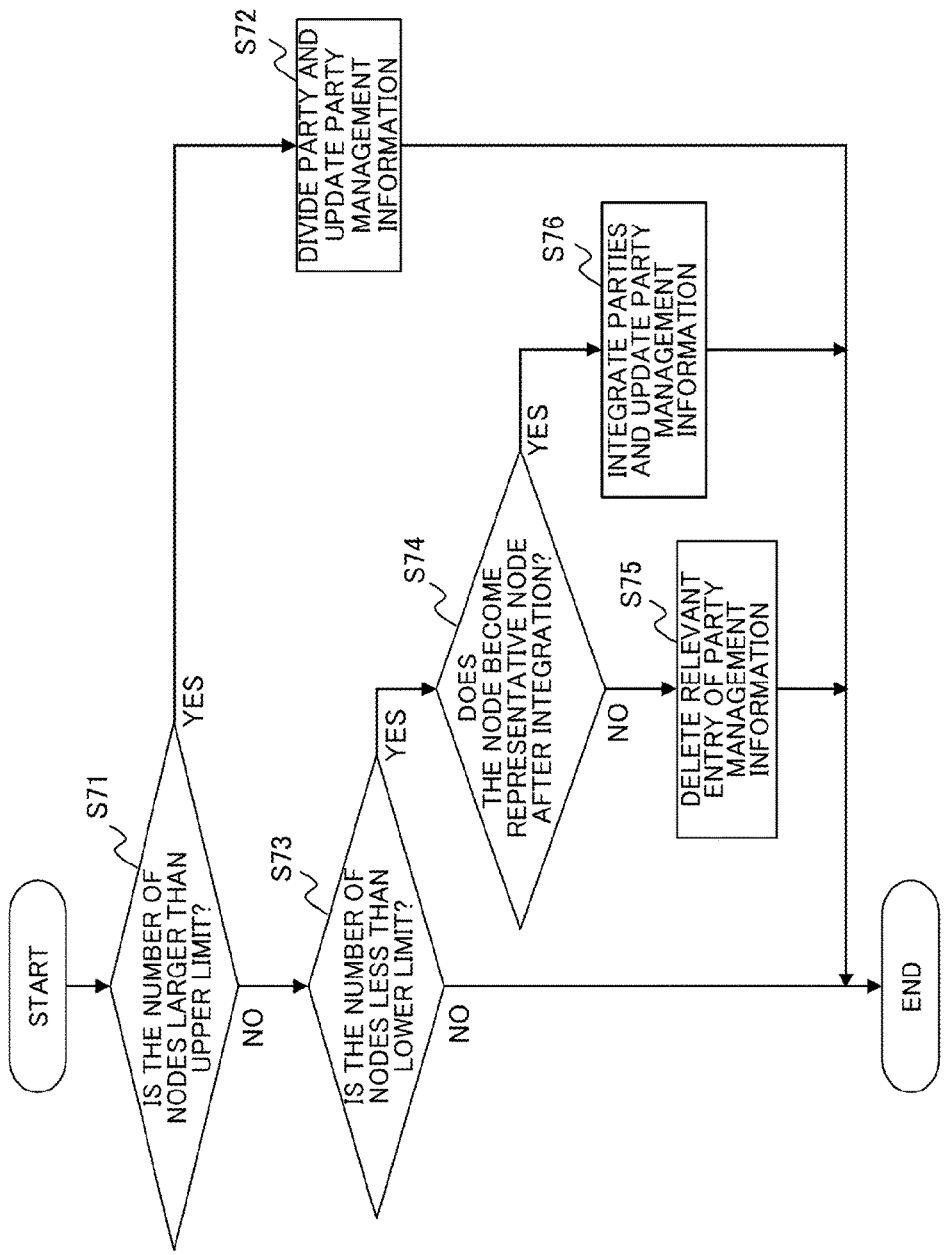
FIG. 26 is a flow chart illustrating an example of party division processing and party integration processing by a node as an example of the second embodiment.

Next, an example of the operation of the node 10A as an example of the second embodiment configured as described above will be described with reference to FIGS. 24 to 26. FIG. 24 is a flow chart illustrating an example of the operation when the representative node 10A as an example of the second embodiment determines each state of the other representative nodes 10A. FIG. 25 is a flow chart illustrating an example of the operation when the other nodes 10A in the party are stopped by the node 10A. FIG. 26 is a flow chart illustrating an example of the operation of party division processing and party integration processing by the node 10A.

[2-3-1] Example of Operation when a Representative Node Determines Each State of Other Representative Nodes First, an example of the operation when the representative node 10A determines each state of the other representative nodes 10A will be described with reference to FIG. 24.

In addition, the process of steps S41 to S55 illustrated in FIG. 24 is a process performed when the state of another representative node 10A is determined by the inter-party node state determination unit 103 in each representative node 10A. Therefore, the process of steps S41 to S55 is performed periodically (every first predetermined time) for each of the other nodes 10A by the inter-party node state determination unit 103 of each representative node 10A.

In addition, the process of steps S41 to S49, S52, and S53 illustrated in FIG. 24 is different from the process of steps S11 to S19, S22, and S23 illustrated in FIG. 12 in that the node 10 (10A) to be determined is the representative node 10A. In the following explanation of the process of steps S41 to S49, S52, and S53, explanation of the same portions as in the process of steps S11 to S19, S22, and S23 illustrated in FIG. 12 will be omitted.

As illustrated in FIG. 24, the inter-party node state determination unit 103 determines which state the last determination state for the representative node 10A to be determined is with reference to "state" in the node state management information T7 (steps S41, S46, and S49).

When the last determination state for the representative node 10A to be determined is Alive (Yes route in step S41), the process proceeds to step S42. In step S42, the inter-party node state determination unit 103 determines whether or not the non-arrival time of a heartbeat from the representative node 10A to be determined exceeds a threshold value.

When the heartbeat non-arrival time exceeds a threshold value (Yes route in step S42), the inter-party node state determination unit 103 determines the state of the representative node 10A to be determined to be Suspect (step S43), and the process is ended. In this case, the inter-party node state determination unit 103 sets Suspect in "state" in the node state management information T7 for the representative node 10A to be determined. Then, when there is the next representative node 10A to be determined, the inter-party node state determination unit 103 proceeds to a process of determining the state related to the next representative node 10A to be determined.

On the other hand, when the inter-party node state determination unit 103 determines that the heartbeat non-arrival time does not exceed the threshold value in step S42 (No route in step S42), the process proceeds to step S44. In step S44, the inter-party node state determination unit 103 determines whether or not the state of the representative node 10A to be determined has been determined to be Suspect by the majority (first predetermined value) of representative nodes 10A. Alternatively, the inter-party node state determination unit 103 determines whether or not the state of the representative node 10A to be determined has been determined to be Down by any of the plurality of representative nodes 10A.

When the state of the representative node 10A to be determined is not determined to be Suspect by the majority of representative nodes 10A and is not determined to be Down by any representative node 10A (No route in step S44), the process on the representative node 10A is ended. On the other hand, when the state of the representative node 10A to be determined is determined to be Suspect by the majority of representative nodes 10A or is determined to be Down by any representative node 10A (Yes route in step S44), the process proceeds to step S45.

In step S45, the state of the representative node 10A to be determined is determined to be Down by the inter-party node state determination unit 103, and the process is ended. In this case, the inter-party node state determination unit 103 sets Down in "state" in the node state management information T7 for the representative node 10A to be determined.

In addition, when the last determination state for the representative node 10A to be determined is Suspect (No route in step S41 to Yes route in step S46), the process proceeds to step S47. In step S47, the inter-party node state determination unit 103 determines whether or not a new heartbeat has been received from the representative node 10A to be determined.

When a new heartbeat has not been received (No route in step S47), the process proceeds to step S44. On the other hand, when a new heartbeat is received (Yes route in step S47), the inter-party node state determination unit 103 determines the state of the representative node 10A to be determined to be Alive (step S48), and the process is ended. In this case, the inter-party node state determination unit 103 sets Alive in "state" in the node state management information T7 for the representative node 10A to be determined.

When the last determination state for the representative node 10A to be determined is Down (No route in step S41, No route in step S46, and Yes route in step S49), the process proceeds to step S50. In step S50, the inter-party node state determination unit 103 determines whether or not the state of the representative node 10A to be determined has been determined to be Down by a second predetermined number of representative nodes 10A (for example, all representative nodes 10A).

When the state of the representative node 10A to be determined is not determined to be Down by all representative nodes 10A (No route in step S50), the process on the representative node 10A to be determined is ended. On the other hand, when the state of the representative node 10A to be determined is determined to be Down by all representative nodes 10A (Yes route in step S50), the process proceeds to step S54. In step S54, the node state determination unit 13 determines whether or not the other nodes 10A are alive in the party, that is, whether or not the other nodes 10A determined to be in the state of Alive are present in the party.

When it is determined that the other nodes 10A that are alive in the party are not present in step S54 (No route in step S54), the process proceeds to step S51. In step S51, the states of all nodes 10A belonging to the party are determined to be Zombie by the inter-party node state determination unit 103. In addition, when data held in the node 10A is associated with data held in any node 10A belonging to the party, recovery processing on the node 10A is performed by the recovery processing unit 15, and the process is ended. In this case, the node state determination unit 13 sets Zombie in "state" in the node state management information T7 for all nodes 10A belonging to the party.

On the other hand, when it is determined that the other nodes 10A that are alive in the party are present in step S54 (Yes route in step S54), the process proceeds to step S55. In step S55, the first node 10A of the other nodes 10A that are alive is determined to be the new representative node 10A to be determined by the inter-party node state determination unit 103, and the process is ended. In addition, this determination is performed based on a predetermined rule for selecting the representative node 10A (for example, the node 10A having a smallest node ID). The representative node 10A communicates a next heartbeat to the new representative node 10A to be determined that has been selected in step S55.

When the last determination state for the representative node 10A to be determined is Zombie (No route in step S41, No route in step S46, and No route in step S49), the process proceeds to step S52. In step S52, the inter-party node state determination unit 103 determines whether or not the recovery processing on the representative node 10A to be determined has been completed. When the recovery processing is not completed, the process on the representative node 10A to be determined is ended. On the other hand, when the recovery processing has been completed (Yes route in step S52), the inter-party node state determination unit 103 deletes information regarding the representative node 10A to be determined from the node state management information T7 (step S53), and the process is ended.

As described above, the process of determining the state of another representative node 10A is performed by the representative node 10A.

[2-3-2] Example of Operation when Other Nodes in a Party are Stopped by a Node

Next, an example of the operation when the other nodes 10A in a party are stopped by the node 10A will be described with reference to FIG. 25.

In addition, the process of steps S61 to S63 illustrated in FIG. 25 is a process performed when the state of the representative node 10A of the party is determined by the node state determination unit 13A in each member node 10A. Therefore, the process of steps S61 to S63 is performed periodically (every first predetermined time) for the representative node 10A of the party by the node state determination unit 13A of the member node 10A.

As illustrated in FIG. 25, it is determined whether or not the representative node 10A of the party has been stopped based on the determination of each state of the other nodes 10A in the party by the member node 10A (step S61).

When the representative node 10A of the party is not stopped (No route in step S61), the process is ended. When there is the next member node 10A to be determined, the node state determination unit 13A proceeds to a process of determining the state related to the next member node 10A to be determined.

On the other hand, when the representative node 10A of the party has been stopped (Yes route in step S61), it is determined whether or not the node 10A is to become the representative node 10A (step S62). In addition, this determination is performed based on a predetermined rule for selecting the representative node 10A.

When the node 10A determines that the node 10A is to become the representative node 10A in step S62 (Yes route in step S62), communication of a heartbeat with each of the representative nodes 10A of other parties is started (step S63), and the process is ended.

On the other hand, when the node 10A determines that the node 10A is not to become the representative node 10A in step S62 (No route in step S62), the process is ended.

As described above, the process when the other nodes 10A in the party are stopped by the node 10A is ended.

[2-3-3] Example of Party Division Processing and Party Integration Processing of a Node Next, an example of the operation of party division processing and party integration processing of the node 10A will be described with reference to FIG. 26.

As illustrated in FIG. 26, the party management unit 105 of the representative node 10A determines whether or not the number of nodes 10A of the party exceeds the upper limit, for example, every predetermined time (step S71).

When the number of nodes 10A exceeds the upper limit (Yes route in step S71), the party management unit 105 of the representative node 10A divides the party into two parties and updates the party management information T4 (step S72). In addition, as described above, if there is a remainder when dividing the party so that the number of nodes is reduced to ½, the party management unit 105 assigns the remaining node 10A to either of two parties after the division. In addition, the party management unit 105 determines to which of the parties after division the node 10A of the party is to be assigned based on the node ID and the connection relationship of the node 10A and the switch 20.

When the number of nodes 10A is equal to or less than the upper limit in step S71 (No route in step S71), the party management unit 105 determines whether or not the number of nodes 10A of the party is less than the lower limit (step S73).

When the number of nodes 10A is less than the lower limit (Yes route in step S73), the party and other parties are integrated by the party management unit 105 of the representative node 10A. Specifically, the party management unit 105 of the representative node 10A determines other parties to be integrated with the party based on the node ID, connection relationship of the node 10A and the switch 20, the number of hops to the representative node 10A of other parties, and the like.

Then, the party management unit 105 of the representative node 10A determines whether or not the node 10A is to become the representative node 10A after absorption (step S74). Specifically, the party management unit 105 of the representative node 10A compares the node ID of the node 10A with the node ID of the determined representative node 10A of other parties with reference to the party management information T4 and the node state management information T7. Then, the party management unit 105 determines whether or not the node ID of the node 10A is smaller than the node ID of the representative node 10A of other parties.

When it is determined that the node 10A does not become the representative node 10A after integration (No route in step S74), the entry of the party of the party management information T4 is deleted by the party management unit 105 of the representative node 10A (step S75), and the process is ended.

On the other hand, when it is determined that the node 10A becomes the representative node 10A after integration (Yes route in step S74), the party and other parties are integrated by the party management unit 105 of the representative node 10A. Specifically, node IDs of other parties to be integrated are merged with the node ID of the entry of the party of the party management information T4 by the party management unit 105 of the representative node 10A, so that the party management information T4 is updated (step S76). Then, the process of the party management unit 105 is ended.

In addition, as described above, the process of step S71 may be started when the transmission information T3 transmitted from the new node 10A added to the storage system 1 is received.

In addition, the process of step S73 may be started when a failure or the like occurs in the node 10A in the party and the recovery processing of the node 10A is completed.

Further, the process of steps S71 and S72 and the process of steps S73 to S76 may be performed independently of each other, and the processing order may be changed.

[2-4] Summary of the Second Embodiment

As described above, according to the node 10A as an example of the second embodiment, the same effect as for the node 10 according to the first embodiment can be obtained.

In addition, according to the node 10A as an example of the second embodiment, a plurality of nodes 10A are divided into a plurality of parties. In addition, in the representative node 10A of each party, the inter-party reception processing unit 102 receives the representative node state information T5 from the other representative nodes 10A in other parties. In addition, the inter-party node state determination unit 103 determines each state of the plurality of representative nodes 10A based on the representative node state information T5. Further, the inter-party transmission processing unit 104 transmits the representative node state information for transmission T5 regarding each state of the plurality of representative nodes 10A, which is determined by the inter-party node state determination unit 103, to each of the other representative nodes 10A.

Further, in each of the plurality of nodes 10A, the transmission processing unit 14A transmits the node state information for transmission T6 to each of the other nodes 10A in the party. In addition, the node state determination unit 13A determines the state of each node 10A in the node 10A based on the node state information T6 received from each of the other nodes 10A in the party by the reception processing unit 12A.

In this case, the state of the node 10A in the party is determined by the member node 10A, and the state between parties (between the representative nodes 10A) is determined by the representative node 10A.

Therefore, even if the number of nodes 10A is increased in the storage system 1, it is possible to suppress an increase in the cost of transmitting and receiving a heartbeat since it is possible to narrow the direct transmission destination of information exchanged between nodes.

That is, it is possible to reduce the communication load and the processing load in the storage system 1, compared with a case where the communication of a heartbeat in the full mesh state by all nodes 10A is performed in the storage system 1.

In addition, when the number of nodes 10A in the party exceeds the fourth predetermined value, the party management unit 105 in each representative node 10A separates the plurality of nodes 10A from the party to generate a new party.

In this manner, it is possible to suppress the performance degradation of the storage system 1 due to the processing load of the node 10A and the load of the network that are caused by the communication of a heartbeat within the party.

Further, the party management unit 105 determines the plurality of nodes 10A, which are to be separated from the party, based on information regarding the connection relationship of the node 10A and the switch 20 in the party.

Therefore, it is possible to suppress the influence of latency or packet loss according to the distance between the nodes 10A.

In addition, when the number of nodes 10A in the party is less than a fifth predetermined value, the party management unit 105 integrates the party with any of other parties.

In this manner, it is possible to suppress the performance degradation of the storage system 1 due to the processing load of the representative node 10A and the load of the network that are caused by the communication of a heartbeat between a number of representative nodes 10A.

[3] Others

While the preferred embodiments of the present invention have been described in detail, the present invention is not limited to the above specific embodiments, and various changes and modifications can be made without departing from the scope and spirit of the present invention.

For example, the configuration and the number of nodes 10 and 10A and switches 20 included in the storage system 1 according to each of the first and second embodiments are not limited to those described above, and any configuration and number can be adopted.

In addition, although the processing in the nodes 10 and 10A included in the storage system 1 has been described in the first and second embodiments, the present invention is not limited thereto. The nodes 10 and 10A may be information processing devices, such as servers that perform processing on information, as well as storage devices, and the storage system 1 may be an information processing system including a plurality of information processing devices.

In addition, although the first and second embodiments have been described on the assumption that the nodes 10 and 10A perform heartbeat communication through the IP line used for the service of the storage system 1, for example, the present invention is not limited thereto. For example, the nodes 10 and 10A may be connected to each other through a dedicated control line, such as a LAN cable, and heartbeat communication may be performed using the dedicated line. In this case, it is possible to reduce the load of the network of the IP line. In addition, when the IP line is used, the nodes 10 and 10A can detect a failure of the path between the node 10 and 10A. In this case, it is possible to extend the monitoring range compared with a case where the dedicated line is used.

Further, although the second embodiment has been described on the assumption that the node 10A forms a party of one stage, the present invention is not limited thereto, and the node 10A may form a multi-stage party. That is, when a number of representative nodes 10A (for example, hundreds to thousands of nodes 10A) are present, it is possible to divide the representative nodes 10A into a plurality of high-order parties and to perform heartbeat communication between the high-order parties while performing heartbeat communication between the representative node 10A in each high-order party.

In addition, although all nodes 10A may become the representative node 10A in the second embodiment, the present invention is not limited thereto. For example, an NG list to exclude the node 10A whose processing load does not need to be increased, such as the node 10A that performs specific processing, from the candidate of the representative node 10A may be shared among the nodes 10A. In this case, each node 10A makes the node 10A included in the NG list be not selected as the representative node 10A.

Further, the functions of the nodes 10 and 10A according to the first and second embodiments may be appropriately omitted, divided, or integrated. For example, the inter-party reception processing unit 102 and the reception processing unit 12A according to the second embodiment may be integrated to form one reception processing unit, and the inter-party transmission processing unit 104 and the transmission processing unit 14A may be integrated to form one transmission processing unit. In addition, the inter-party node state determination unit 103 and the node state determination unit 13A may be integrated to form one node state determination unit (determination unit).

In addition, when the node 10A according to the second embodiment operates as the representative node 10A, the node 10A according to the second embodiment executes the functions of the inter-party reception processing unit 102, the inter-party node state determination unit 103, the inter-party transmission processing unit 104, and the party management unit 105. Therefore, when the node 10A does not operate as the representative node 10A (for example, when the node 10 is registered in the above-described NG list), these functions may be disabled or omitted.

Further, the execution order of the steps of each process flow in the examples of the first and second embodiments may be appropriately changed.

In addition, all or some of the various functions of the node 10 according to the first embodiment and the node 10A according to the second embodiment may be realized when a computer (including a CPU, an information processing device, and various terminals) executes a predetermined program.

The program is provided, for example, in a form recorded on a computer-readable recording medium (for example, the recording medium 10h illustrated in FIG. 2), such as a flexible disk, a CD, a DVD, and a Blue-ray Disc. In addition, a CD-ROM, a CD-R, a CD-RW, and the like can be mentioned as the CD. In addition, a DVD-ROM, a DVD-RAM, a DVD-R, a DVD-RW, a DVD+R, a DVD+RW, and the like can be mentioned as the DVD. In this case, a computer reads a program from the recording medium and transmits and stores the program to its internal storage device or external storage device to use the program.

Here, the computer is a concept including hardware and an operating system (OS), and means hardware that operates under the control of the OS. In addition, when no OS is used and hardware is operated by the application program alone, the hardware itself is equivalent to the computer. Hardware includes at least a microprocessor, such as a CPU, and means for reading a computer program recorded on a recording medium. The above-described program includes program codes causing the above-described computer to realize various functions of the node 10 according to the first embodiment or the node 10A according to the second embodiment. In addition, some of the functions may be realized by the OS instead of the application program.

According to the technique disclosed, it is possible to suppress a reduction in availability in the information processing system including a plurality of information processing devices.

All examples and conditional language provided herein are intended for pedagogical purposes to aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiment(s) of the present invention have been described in detail, it should be understood that the various changes, substitutions, and alterations could be made hereto without departing from the spirit and scope of the invention.

What is claimed is:

1. An information processing system, comprising:
   a plurality of information processing devices connected to each other, communication being performed between the plurality of information processing devices, each of the plurality of information processing devices includes a processor, and
   the processor included in one of the plurality of information processing devices serving as a first information processing device
   receives first sets of states from a plurality of second information processing devices other than the first information processing device, each of the first sets of states including respective states of the plurality of information processing devices, and each of the plurality of second information processing devices determining and transmitting one of the first sets of states,
   determines a state of each of the plurality of information processing devices, based on the first sets of states received from the plurality of second information processing devices and a reception status of the first sets of states received from the plurality of second information processing devices,
   transmits, every first predetermined time, a second set of states for transmission including the determined state of each of the plurality of information processing devices to each of the plurality of second information processing devices,
   determines one of the second information processing devices to be a first state indicating a possibility of stop when one of the first sets of states has not been received from the second information device within a second predetermined time that is a time equal to or longer than the first predetermined time, and
   determines a state of an information processing device, which is determined to be in the first state by the plurality of information processing devices of a first predetermined number or more, or a state of an information processing device, which is determined to be in a second state indicating stop by at least one of the second information processing devices, to be the second state, based on the received first sets of states.

2. The information processing system according to claim 1, wherein the processor determines each state of the plurality of information processing devices, based on each state of the plurality of information processing devices indicated by the received first sets of states and self-state information regarding a state of the first information processing device including the processor.

3. The information processing system according to claim 1, wherein the processor
   determines an information processing device, which is determined to be in the second state by the plurality of information processing devices the number of which is equal to or greater than a second predetermined number that is a number equal to or greater than the first predetermined number, to be in a third state indicating recovery processing, based on the received first sets of states, and
   each processor provided in one or more information processing devices of the plurality of information processing devices further performs recovery processing on the information processing device determined to be in the third state and blocks access to the information processing device determined to be in the third state from information processing devices which do not concerns to the recovery processing.

4. The information processing system according to claim 1, wherein the processor
   determines a state of the first information processing device to be the second state when a predetermined failure occurs in the first information processing device,
   determines the state of the first information processing device to be a fourth state indicating separation from the second information processing devices when the first sets of states are not received from the second information processing devices of a third predetermined number or more within the second predetermined time, and performs processing for stopping the first information processing device when a predetermined failure occurs in the first information processing device and the state of the first information processing device is determined to be the second state or when the state of the first information processing device is determined to be the fourth state.

5. The information processing system according to claim 1, wherein the plurality of information processing devices are divided into a plurality of groups, and a representative information processing device in each of the plurality of groups includes the processor, the processor included in the representative information processing device in one of the plurality of groups serving as a first group further receives first representative sets of states from other representative information processing devices in second groups other than the first group, each of the first representative sets of states including respective states of the representative information processing devices of the plurality of groups, and each of the other representative information processing devices determining one of the first representative sets of states, determines a state of each of the plurality of representative information processing devices, based on the first representative sets of states received from the other representative information processing devices, and transmits a second representative set of states for transmission including each of the determined states of the plurality of representative information processing devices to each of the other representative information processing devices, and the processor included in the first information processing device in the first group transmits the second set of states for transmission to each of other information processing devices in the first group and determines each state of information processing devices in the first group, based on the first sets of states received from the second information processing devices in the first group.

6. The information processing system according to claim 5, wherein the processor included in the representative information processing device in the first group further creates a new group by separating a plurality of information processing devices from the first group when the number of information processing devices in the first group exceeds a fourth predetermined value.

7. The information processing system according to claim 6, further comprising:

a connection device that is provided between the plurality of information processing devices and relays information transmitted and received between the plurality of information processing devices, wherein the processor included in the representative information processing device in the first group determines a plurality of information processing devices to be separated from the first group, based on information regarding connection relationship between the connection device and information processing devices in the first group.

8. The information processing system according to claim 6, wherein the processor included in the representative information processing device in the first group integrates the first group and any group of the second groups when the number of information processing devices in the first group is less than a fifth predetermined value.

9. A computer-readable recording medium having stored therein a control program for causing each of information processing devices connected to each other to execute a process for controlling each of the plurality of information processing devices serving as a first information processing device, the process comprising:

receiving first sets of states from a plurality of second information processing devices other than the first information processing device, each of the first sets of states including respective states of the plurality of information processing devices, and each of the plurality of second information processing devices determining and transmitting one of the first sets of states, determining a state of each of the plurality of information processing devices, based on the first sets of states received from the plurality of second information processing devices and a reception status of the first sets of states received from the plurality of second information processing devices, transmitting, every first predetermined time, a second set of states for transmission including the determined state of each of the plurality of information processing devices to each of the plurality of second information processing devices, determines one of the second information processing devices to be a first state indicating a possibility of stop when one of the first sets of states has not been received from the second information device within a second predetermined time that is a time equal to or longer than the first predetermined time, and determines a state of an information processing device, which is determined to be in the first state by the plurality of information processing devices of a first predetermined number or more, or a state of an information processing device, which is determined to be in a second state indicating stop by at least one of the second information processing devices, to be the second state, based on the received first sets of states.

10. A control method of an information processing system in which a plurality of information processing devices connected to each other are provided and communication is performed between the plurality of information processing devices, the control method comprising:

in each of the plurality of information processing devices serving as a first information processing device, receiving first sets of states from a plurality of second information processing devices other than the first information processing device, each of the first sets of states including respective states of the plurality of information processing devices, and each of the plurality of second information processing devices determining and transmitting one of the first sets of states;

determining a state of each of the plurality of information processing devices, based on the first sets of states received from the plurality of second information processing devices and a reception status of the first sets of states received from the plurality of second information processing devices;

transmitting, every first predetermined time, a second set of states for transmission including the determined state of each of the plurality of information processing devices to each of the plurality of second information processing devices;

determining one of the second information processing devices to be a first state indicating a possibility of stop when one of the first sets of states has not been received from the second information device within a second predetermined time that is a time equal to or longer than the first predetermined time, and determining a state of an information processing device, which is determined to be in the first state by the plurality of information processing devices of a first predetermined number or more, or a state of an information processing device, which is determined to be in a second state indicating stop by at least one of the second information processing devices, to be the second state, based on the received first sets of states.

* * * * *